(12) United States Patent
Chun et al.

(10) Patent No.: US 10,380,716 B2
(45) Date of Patent: Aug. 13, 2019

(54) ELECTRONIC DEVICE FOR PROVIDING OMNIDIRECTIONAL IMAGE AND METHOD THEREOF

(71) Applicant: SAMSUNG ELECTRONICS CO., LTD., Suwon-si, Gyeonggi-do (KR)

(72) Inventors: Jae Bong Chun, Suwon-si (KR); Jin Gil Yang, Suwon-si (KR); Yo Han Lee, Seongnam-si (KR); Jung Eun Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/464,985

(22) Filed: Mar. 21, 2017

(65) Prior Publication Data

US 2017/0270635 A1    Sep. 21, 2017

(30) Foreign Application Priority Data

Mar. 21, 2016    (KR) .......................... 10-2016-0033221

(51) Int. Cl.
| | |
|---|---|
| *G06T 3/00* | (2006.01) |
| *G11B 27/10* | (2006.01) |
| *G11B 27/00* | (2006.01) |
| *G06F 3/01* | (2006.01) |
| *G06F 1/16* | (2006.01) |

(52) U.S. Cl.
CPC ............ *G06T 3/0087* (2013.01); *G06F 1/163* (2013.01); *G06F 3/011* (2013.01); *G06F 3/012* (2013.01); *G06F 3/013* (2013.01); *G11B 27/005* (2013.01); *G11B 27/10* (2013.01)

(58) Field of Classification Search
CPC .............................. G06T 3/0087; G06F 1/163
See application file for complete search history.

(56) References Cited

U.S. PATENT DOCUMENTS

| | | | |
|---|---|---|---|
| 9,381,429 B2 | 7/2016 | Raitt et al. | |
| 9,389,832 B2 | 7/2016 | Karlsson | |
| 9,432,629 B2 | 8/2016 | Olsen, Jr. | |
| 9,934,823 B1* | 4/2018 | Bentley | .............. G11B 27/3081 |
| 2010/0043040 A1 | 2/2010 | Olsen, Jr. | |
| 2011/0234796 A1 | 9/2011 | Taber | |
| 2012/0028706 A1 | 2/2012 | Raitt et al. | |

(Continued)

FOREIGN PATENT DOCUMENTS

WO    WO 2014/077454    5/2014

*Primary Examiner* — Girumsew Wendmagegn
(74) *Attorney, Agent, or Firm* — Nixon & Vanderhye P.C.

(57) ABSTRACT

An electronic device includes a display circuit, a sensor circuit, a processor, and a memory. The memory stores instructions, which when executed by the processor, cause the electronic device to provide an omnidirectional image having a size larger than the screen through the display circuit, to provide the screen with a first area being a partial area of the omnidirectional image, to obtain information of a change in a direction, which the electronic device faces, through the sensor circuit when the omnidirectional image is provided, to provide the screen with a second area being another partial area of the omnidirectional image through the display circuit based on the obtained information, and to store a time point, at which the direction is changed, wherein the time point is correlated with a time point or a frame at which the omnidirectional image is provided.

9 Claims, 25 Drawing Sheets

(56) References Cited

U.S. PATENT DOCUMENTS

| | | |
|---|---|---|
| 2014/0114917 A1 | 4/2014 | Karlsson |
| 2015/0038215 A1 | 2/2015 | Kim |
| 2016/0012855 A1* | 1/2016 | Krishnan ............. G11B 27/105 386/241 |
| 2017/0083084 A1* | 3/2017 | Tatsuta ................... G06F 3/048 |

* cited by examiner

SHARING  SOURCE CODE  E-MAIL http://youtu.be/wczdECcwRw0?t=42s

☑ STARTING TIME: 0:27     ☑ | 1. DIRECTOR'S CUT | ← 1515
                              | 2. POPULAR TOP1 |
                              | 3. MOST SHARING TOP1 |
                              | 4. CURRENT DIRECTION |

1510

SHARING  SOURCE CODE  E-MAIL http://youtu.be/wczdECcwRw0?t=42s&vrlog=1

☑ STARTING TIME: 0:27     ☑  1. DIRECTOR'S CUT: vrlog=1 ← 1525

1520

ELECTRONIC DEVICE FOR PROVIDING OMNIDIRECTIONAL IMAGE AND METHOD THEREOF

CROSS-REFERENCE TO RELATED APPLICATION

This application is based on and claims priority under 35 U.S.C. § 119 to a Korean patent application filed on Mar. 21, 2016 in the Korean Intellectual Property Office and assigned Serial number 10-2016-0033221, the disclosure of which is incorporated by reference herein in its entirety.

TECHNICAL FIELD

The present disclosure relates generally to an electronic device that provides an omnidirectional image and a method thereof.

BACKGROUND

With developments of information and communication technology, network devices such as a base station and the like are installed throughout the country. An electronic device transmits and receives data to and from another electronic device over a network, and thus a user utilizes the network freely anywhere in the country.

Various types of electronic devices may provide a variety of functions depending on recent trends in digital convergence. For example, a smartphone supports an internet access function using the network, a music or video playing function, and a photo or video capturing function using an image sensor, in addition to a call function.

As well as the functions, the shapes of the various types of electronic devices are evolving. The electronic device may be a hand-held device or a wearable device that is mounted on a wrist, a head, or the like of a user.

An omnidirectional image refers to an image including an image of all directions with respect to a virtual center point. The omnidirectional image may be, for example, an image of a virtual spherical shape or may be a panorama image of a virtual cylindrical shape. The electronic device may output a partial area of the omnidirectional image through a screen or may output another area of the omnidirectional image through the screen based on a motion such as a rotation, a movement, or the like of the electronic device.

In the case of a conventional electronic device, since the movement of the electronic device is not recorded when the omnidirectional image is played, if the same omnidirectional image is played again, to watch a previously output area, the user needs to find out the previously output area from the omnidirectional image by rotating or moving the electronic device. For example, in the case where the omnidirectional image is replayed, a time point, at which the omnidirectional image is first played, of a user may not be applied to the replayed omnidirectional image.

SUMMARY

Various example aspects of the present disclosure address at least the above-mentioned problems and/or disadvantages and provide at least the advantages described below. Accordingly, an example aspect of the present disclosure is to provide an electronic device that provides an omnidirectional image and provides a new image based on a change in a direction of an electronic device when the omnidirectional image is provided.

In accordance with an example aspect of the present disclosure, an electronic device includes a display circuit configured to provide a visual effect through a screen of the electronic device, a sensor circuit configured to obtain information about a status of the electronic device or a status of a periphery of the electronic device, a processor electrically connected with the display circuit and the sensor circuit, and a memory electrically connected with the processor. The memory stores instructions which, when executed by the processor, cause the processor to provide an omnidirectional image having a size larger than the screen through the display circuit, to provide the screen with a first area, the first area being a partial area of the omnidirectional image, to obtain information about a change in a direction, which the electronic device faces, through the sensor circuit when the omnidirectional image is provided, to provide the screen with a second area, the second area being another partial area of the omnidirectional image through the display circuit based on the obtained information, and to store a time point, at which the direction is changed, such that the time point is correlated with a time point or a frame at which the omnidirectional image is provided.

Other aspects, advantages, and salient features of the disclosure will become apparent to those skilled in the art from the following detailed description, which, taken in conjunction with the annexed drawings, discloses various example embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
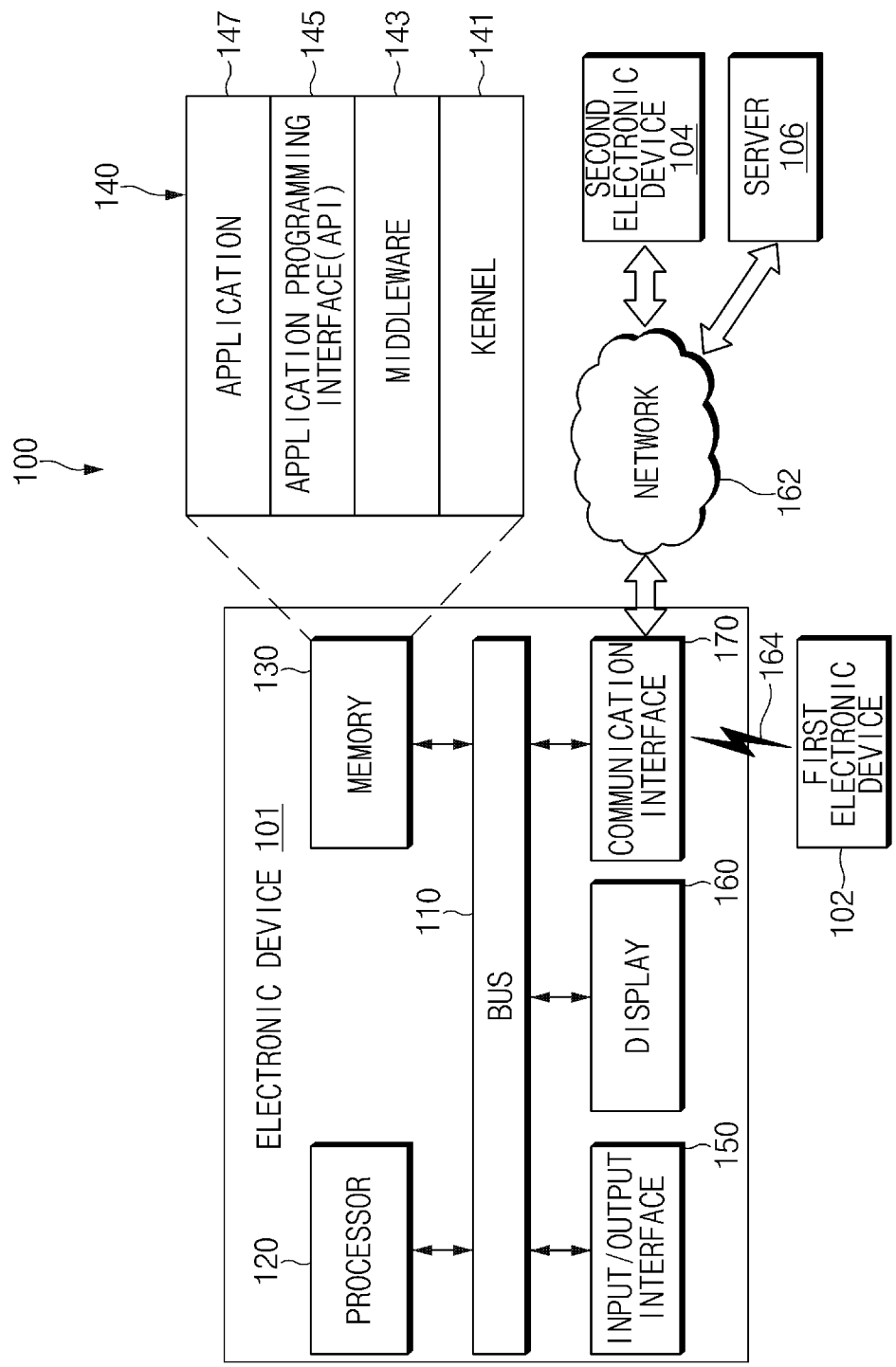
FIG. 1 is a diagram illustrating an example electronic device in a network environment, according to various example embodiments of the present disclosure.

Various example embodiments of the present disclosure may be described in greater detail with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In the disclosure disclosed herein, the expressions 'have', 'may have', 'include' and 'comprise', or 'may include' and 'may comprise' used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, a first user device and a second user device indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" may not mean only "specifically designed to" in hardware. Instead, the expression "a device configured to" may mean that the device is "capable of" operating together with another device or other components. For example, a "processor configured to (or set to) perform A, B, and C" may refer to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe various example embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices, or the like, but is not limited thereto. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit), or the like, but is not limited thereto.

According to another embodiment, the electronic devices may be home appliances. The home appliances may include at least one of, for example, televisions (TVs), digital video disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV', or Google TV™), game consoles (e.g., Xbox™ or PlayStation™), electronic dictionaries, electronic keys, camcorders, electronic picture frames, or the like, but is not limited thereto.

According to another embodiment, the electronic device may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like), or the like, but is not limited thereto.

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like), or the like, but is not limited thereto. According to various embodiments, the electronic device may be one of the above-described devices or a combination thereof. According to an embodiment, an electronic device may be a flexible electronic device. Furthermore, according to an embodiment of the present disclosure, an electronic device may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

In the accompanying drawings below, a smartphone will be exemplified as an electronic device according to an embodiment of the present disclosure, FIG. 1 is a diagram illustrating an example electronic device in a network environment, according to various example embodiments.

Referring to FIG. 1, according to various embodiments, an electronic device 101, a first electronic device 102, a second electronic device 104, and/or a server 106 may be connected with each other through a network 162 or short range communication 164. The electronic device 101 may include a bus 110, a processor (e.g., including processing circuitry) 120, a memory 130, an input/output (I/O) interface (e.g., including I/O interface circuitry) 150, a display 160, and a communication interface (e.g., including communication circuitry) 170. According to an embodiment, the electronic device 101 may not include at least one of the above-described elements or may further include other element(s).

The bus 110 may interconnect the above-described elements 110 to 170 and may be a circuit for conveying communications (e.g., a control message and/or data) among the above-described elements.

The processor 120 may include various processing circuitry, such as, for example, and without limitation, one or more of a dedicated processor, a central processing unit (CPU), an application processor (AP), or a communication processor (CP). The processor 120 may perform, for example, data processing or an operation associated with control or communication of at least one other element(s) of the electronic device 101.

The memory 130 may include a volatile and/or nonvolatile memory. For example, the memory 130 may store instructions or data associated with at least one other component(s) of the electronic device 101. According to an embodiment, the memory 130 may store software and/or a program 140. The program 140 may include, for example, a kernel 141, a middleware 143, an application programming interface (API) 145, and/or an application program (or "application") 147. At least a part of the kernel 141, the middleware 143, or the API 145 may be called an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete elements of the electronic device 101 so as to control or manage system resources.

The middleware 143 may perform, for example, a mediation role such that the API 145 or the application program 147 communicates with the kernel 141 to exchange data.

Furthermore, the middleware 143 may process one or more task requests received from the application program 147 according to a priority. For example, the middleware 143 may assign the priority, which makes it possible to use a system resource (e.g., the bus 110, the processor 120, the memory 130, or the like) of the electronic device 101, to at least one of the application program 147. For example, the middleware 143 may process the one or more task requests according to the priority assigned to the at least one, which makes it possible to perform scheduling or load balancing on the one or more task requests.

The API 145 may be an interface through which the application program 147 controls a function provided by the kernel 141 or the middleware 143, and may include, for example, at least one interface or function (e.g., an instruction) for a file control, a window control, image processing, a character control, or the like.

The I/O interface 150 may include various I/O interface circuitry and transmit an instruction or data, input from a user or another external device, to other element(s) of the electronic device 101. Furthermore, the I/O interface 150 may output an instruction or data, received from other component(s) of the electronic device 101, to a user or another external device.

The display 160 may include, for example, a liquid crystal display (LCD), a light-emitting diode (LED) display, an organic LED (OLED) display, a microelectromechanical systems (MEMS) display, or an electronic paper display, or the like, but is not limited thereto. The display 160 may display, for example, various kinds of contents (e.g., a text, an image, a video, an icon, a symbol, or the like) to a user. The display 160 may include a touch screen and may receive, for example, a touch, gesture, proximity, or hovering input using an electronic pen or a portion of a user's body.

The communication interface 170 may include various communication circuitry and establish communication between the electronic device 101 and an external device (e.g., the first electronic device 102, the second electronic device 104, or the server 106). For example, the communication interface 170 may be connected to a network 162 through wireless communication or wired communication to communicate with an external device (e.g., the second electronic device 104 or the server 106).

According to various embodiments of the present disclosure, the I/O interface 150 and/or the communication interface 170 may support to transmit or receive data of 4K or higher.

The wireless communication may include at least one of, for example, a long-term evolution (LTE), an LTE Advance (LIE-A), a code division multiple access (CDMA), a wideband CDMA (WCDMA), a universal mobile telecommunications system (UMTS), a wireless broadband (WiBro), a global system for mobile communications (GSM), or the like, as a cellular communication protocol. Furthermore, the wireless communication may include, for example, the short range communication 164. The short range communication 164 may include at least one of a wireless fidelity (Wi-Fi), a Bluetooth, a near field communication (NFC), a magnetic stripe transmission (MST), a global navigation satellite system (GNSS), or the like.

The MST may generate a pulse in response to transmission data by using an electromagnetic signal, and the pulse may generate a magnetic field signal. The electronic device 101 may send the magnetic field signal to point of sale (POS). The POS may detect the magnetic field signal using a MST reader and may recover the data by converting the detected magnetic field signal to an electrical signal.

The GNSS may include at least one of a global positioning system (GPS), a global navigation satellite system (Glonass), a Beidou Navigation Satellite System (hereinafter referred to as "Beidou"), or a European global satellite-based navigation system (Galileo). Hereinafter, "GPS" and "GNSS" may be used interchangeably in the present disclosure. The wired communication may include at least one of, for example, a universal serial bus (USB), a high definition multimedia interface (HDMI), a recommended standard 232 (RS-232), a plain old telephone service (POTS), or the like. The network 162 may include at least one of telecommunications networks, for example, a computer network (e.g., LAN or WAN), an Internet, or a telephone network.

Each of the first and second electronic devices 102 and 104 may be a device of which the type is different from or the same as that of the electronic device 101. According to an embodiment, the server 106 may include a server or a group of two or more servers. According to various embodiments, all or a part of operations that the electronic device 101 will perform may be executed by another or plural electronic devices (e.g., the first electronic device 102, the second electronic device 104, or the server 106). According to an embodiment, in the case where the electronic device 101 executes any function or service automatically or in response to a request, the electronic device 101 may not perform the function or the service internally, but, alternatively additionally, it may request at least a portion of a function associated with the electronic device 101 from other electronic device (e.g., the first electronic device 102, the second electronic device 104, or the server 106). The other electronic device may execute the requested function or additional function and may transmit the execution result to the electronic device 101. The electronic device 101 may provide the requested function or service by processing the received result as it is, or additionally. To this end, for example, cloud computing, distributed computing, or client-server computing may be used.

Figure 2:
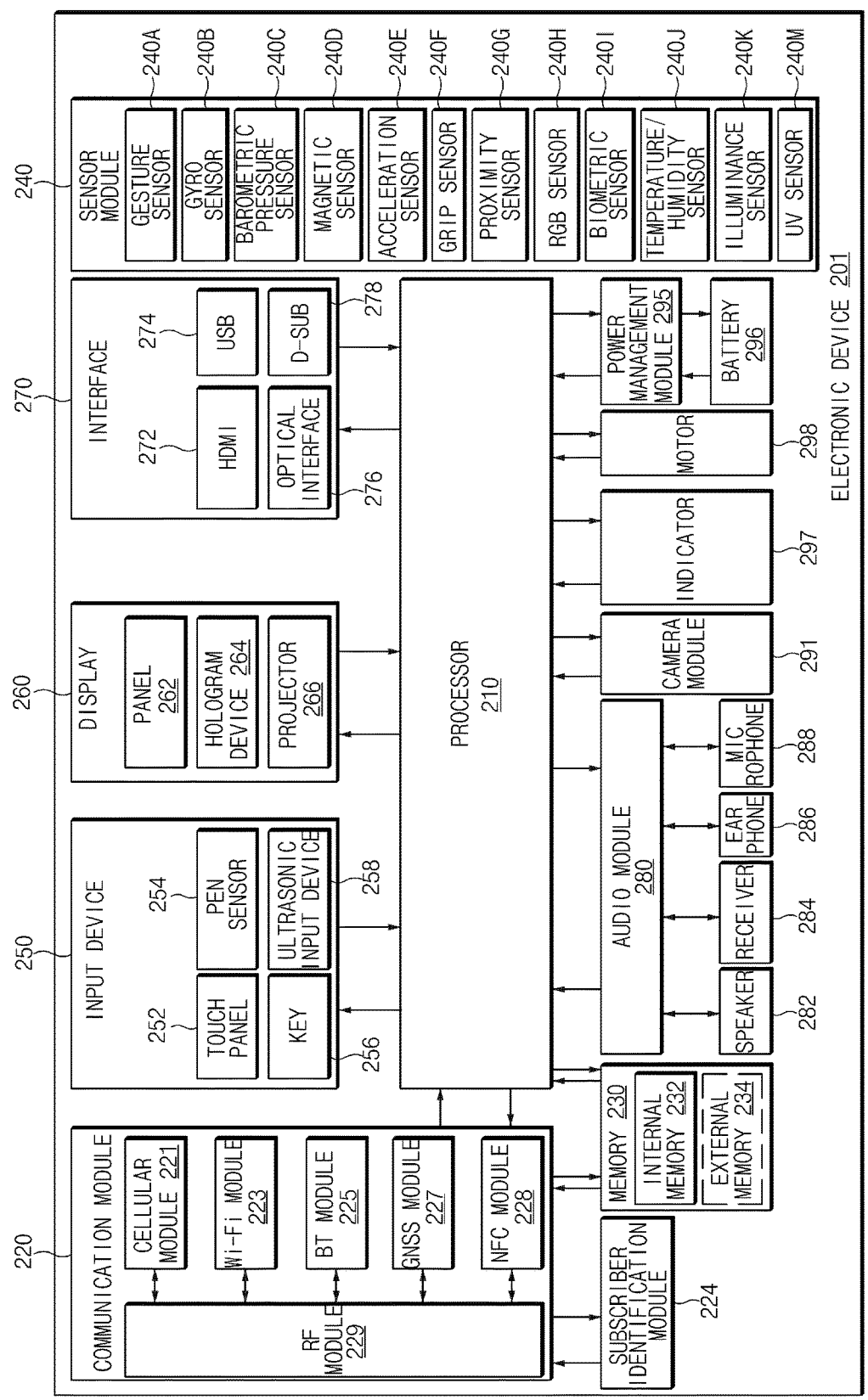
FIG. 2 is a block diagram illustrating an example electronic device, according to various example embodiments of the present disclosure.

FIG. 2 is a block diagram illustrating an example electronic device, according to an embodiment.

Referring to FIG. 2, the electronic device 201 may include, for example, all or a part of the electronic device 101 illustrated in FIG. 1. The electronic device 201 may include one or more processors (e.g., an application processor (AP)) (e.g., including processing circuitry) 210, a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and drive an operating system (OS) or an application program to control a plurality of hardware or software elements connected to the processor 210 and may process and compute a variety of data. The processor 210 may be implemented with a System on Chip (SoC), for example. According to an embodiment of the present disclosure, the AP 210 may further include a graphic processing unit (GPU) and/or an image signal processor. The processor 210 may include at least a part (e.g., a cellular module 221) of elements illustrated in FIG. 2. The processor 210 may load and process an instruction or data, which is received from at least one of other elements (e.g., a nonvolatile memory), and may store a variety of data in a nonvolatile memory.

The communication module 220 may be configured the same as or similar to a communication interface 170 of FIG. 1. The communication module 220 may include various communication circuitry, such as, for example, and without limitation, a cellular module 221, a Wi-Fi module 223, a Bluetooth (BT) module 225, a GNSS module 227 (e.g., a GPS module, a Glonass module, a Beidou module, or a Galileo module), a near field communication (NFC) module 228, and a radio frequency (RF) module 229.

The cellular module 221 may provide voice communication, video communication, a character service, an Internet service, or the like through a communication network. According to an embodiment, the cellular module 221 may perform discrimination and authentication of the electronic device 201 within a communication network using the subscriber identification module 224 (e.g., a SIM card). According to an embodiment, the cellular module 221 may perform at least a portion of functions that the processor 210 provides. According to an embodiment, the cellular module 221 may include a communication processor (CP).

Each of the Wi-Fi module 223, the BT module 225, the GNSS module 227, or the NFC module 228 may include a processor for processing data exchanged through a corresponding module, for example. According to an embodiment, at least a part (e.g., two or more elements) of the cellular module 221, the Wi-Fi module 223, the BT module 225, the GNSS module 227, or the NFC module 228 may be included within one integrated circuit (IC) or an IC package.

The RF module 229 may transmit and receive, for example, a communication signal (e.g., an RF signal). For example, the RF module 229 may include a transceiver, a power amplifier module (PAM), a frequency filter, a low noise amplifier (LNA), an antenna, or the like. According to another embodiment, at least one of the cellular module 221, the Wi-Fi module 223, the BT module 225, the GNSS module 227, or the NFC module 228 may transmit and receive an RF signal through a separate RF module.

The subscriber identification module 224 may include, for example, a card and/or embedded SIM which includes a subscriber identification module and may include unique identification information (e.g., integrated circuit card identifier (ICCID)) or subscriber information (e.g., integrated mobile subscriber identity (IMSI)).

For example, the memory 230 (e.g., the memory 130) may include an internal memory 232 and/or an external memory 234. For example, the internal memory 232 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like)), a hard drive, or a solid state drive (SSD).

The external memory 234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 234 may be functionally and/or physically connected with the electronic device 201 through various interfaces.

The sensor module 240 may measure, for example, a physical quantity or may detect an operating state of the electronic device 201. The sensor module 1040 may convert the measured or detected information to an electrical signal. For example, the sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illuminance sensor 240K, or an UV sensor 240M. Although not illustrated, additionally or generally, the sensor module 240 may further include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit that controls at least one or more sensors included therein. According to an embodiment, the electronic device 201 may further include a processor which is a part of the processor 210 or independent of the processor 210 and is configured to control the sensor module 240. The processor may control the sensor module 240 while the processor 210 remains at a sleep state.

The input device 250 may include various input circuitry, such as, for example, and without limitation, a touch panel 252, a (digital) pen sensor 254, a key 256, or an ultrasonic input device 258. The touch panel 252 may use at least one of capacitive, resistive, infrared and ultrasonic detecting methods. Also, the touch panel 252 may further include a control circuit. The touch panel 252 may further include a tactile layer to provide a tactile reaction to a user.

The (digital) pen sensor 254 may be, for example, a part of a touch panel or may include an additional sheet for recognition. The key 256 may include, for example, a physical button, an optical key, a keypad, and the like. The ultrasonic input device 258 may detect (or sense) an ultrasonic signal, which is generated from an input device, through a microphone (e.g., a microphone 288) and may verify data corresponding to the detected ultrasonic signal.

The display 260 (e.g., the display 160) may include a panel 262, a hologram device 264, or a projector 266. The panel 262 may be configured the same as or similar to the display 160 of FIG. 1. The panel 262 may be implemented to be flexible, transparent or wearable, for example. The panel 262 and the touch panel 252 may be integrated into a single module. The hologram device 264 may display a stereoscopic image in a space using a light interference phenomenon. The projector 266 may project light onto a screen so as to display an image. The screen may be arranged inside or outside the electronic device 201. According to an embodiment, the display 260 may further include a control circuit for controlling the panel 262, the hologram device 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included, for example, in the communication interface 170 illustrated in FIG. 1. Additionally or generally, the interface 270 may include, for example, a mobile high definition link (MHL) interface, a SD card/multi-media card (MMC) interface, or an infrared data association (IrDA) standard interface.

The audio module 280 may convert a sound and an electric signal in dual directions. At least a part of the audio module 280 may be included, for example, in the I/O interface 150 illustrated in FIG. 1. The audio module 280 may process, for example, sound information that is input or output through a speaker 282, a receiver 284, an earphone 286, or a microphone 288.

The camera module 291 for shooting a still image or a video may include, for example, at least one image sensor (e.g., a front sensor or a rear sensor), a lens, an image signal processor (ISP), or a flash (e.g., an LED or a xenon lamp).

The power management module 295 may manage, for example, power of the electronic device 201. According to an embodiment, the power management module 295 may include a power management integrated circuit (PMIC), a charger IC, or a battery or fuel gauge. The PMIC may have a wired charging method and/or a wireless charging method. The wireless charging method may include, for example, a magnetic resonance method, a magnetic induction method, or an electromagnetic method and may further include an additional circuit, for example, a coil loop, a resonant circuit, a rectifier, or the like. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, or the like. The motor 298 may convert an electrical signal into a mechanical vibration and may generate the following effects: vibration, haptic, and the like. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), MediaFLO™, or the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 3:
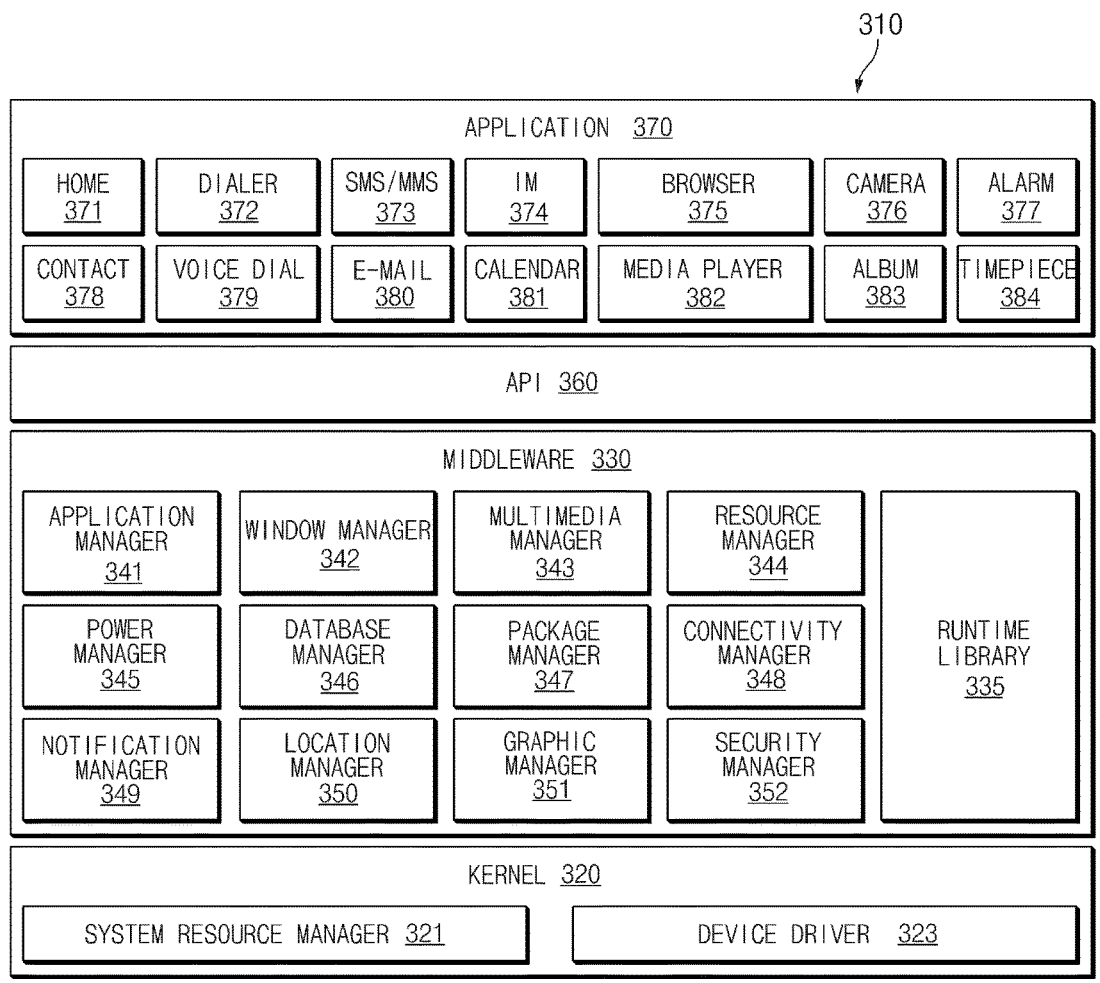
FIG. 3 is a block diagram illustrating an example program module, according to various example embodiments of the present disclosure.

FIG. 3 is a block diagram illustrating an example program module, according to various example embodiments.

According to an embodiment, a program module 310 (e.g., the program 140) may include an operating system (OS) to control resources associated with an electronic device (e.g., the electronic device 101), and/or diverse applications (e.g., the application program 147) driven on the OS. The OS may be, for example, Android™, iOS™, Windows™, Symbian™, Tizen™, Bada™, or the like.

The program module 310 may include a kernel 320, a middleware 330, an API 360, and/or an application 370. At least a part of the program module 310 may be preloaded on an electronic device or may be downloadable from an external electronic device (e.g., the first electronic device 102, the second electronic device 104, the server 106, or the like).

The kernel 320 (e.g., the kernel 141) may include, for example, a system resource manager 321, or a device driver 323. The system resource manager 321 may perform control, allocation, or retrieval of system resources. According to an embodiment, the system resource manager 321 may include a process managing part, a memory managing part, a file system managing part, or the like. The device driver 323 may include, for example, a display driver, a camera driver, a Bluetooth driver, a common memory driver, an USB driver, a keypad driver, a Wi-Fi driver, an audio driver, or an inter-process communication (IPC) driver.

The middleware 330 may provide, for example, a function which the application 370 needs in common or may provide diverse functions to the application 370 through the API 360 to allow the application 370 to efficiently use limited system resources of the electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module, which is used by a compiler, to add a new function through a programming language while the application 370 is being executed. The runtime library 335 may perform input/output management, memory management, capacities about arithmetic functions, or the like.

The application manager 341 may manage, for example, a life cycle of at least one application of the application 370. The window manager 342 may manage a GUI resource which is used in a screen. The multimedia manager 343 may identify a format necessary to play diverse media files, and may perform encoding or decoding of media files by using a codec suitable for the format. The resource manager 344 may manage resources such as a storage space, memory, or source code of at least one application of the application 370.

The power manager 345 may operate, for example, with a basic input/output system (BIOS) to manage a battery or power, and may provide power information for an operation of an electronic device. The database manager 346 may generate, search for, or modify database which is to be used in at least one application of the application 370. The package manager 347 may install or update an application which is distributed in the form of a package file.

The connectivity manager 348 may manage, for example, wireless connection such as Wi-Fi or Bluetooth. The notification manager 349 may display or notify an event such as an arrival message, an appointment, or a proximity notification in a mode that does not disturb a user. The location manager 350 may manage location information of an electronic device. The graphic manager 351 may manage a graphic effect that is provided to a user, or manage a user interface relevant thereto. The security manager 352 may provide a general security function necessary for system security, user authentication, or the like. According to an embodiment, in the case where an electronic device (e.g., the electronic device 101) includes a telephony function, the middleware 330 may further include a telephony manager for managing a voice or video call function of the electronic device.

The middleware 330 may include a middleware module that combines diverse functions of the above-described elements. The middleware 330 may provide a module specialized to each OS kind to provide differentiated functions. In addition, the middleware 330 may remove a part of the preexisting elements, dynamically, or may add new elements thereto.

The API 360 (e.g., the API 145) may be, for example, a set of programming functions and may be provided with a configuration which is variable depending on an OS. For example, in the case where an OS is the android or the iOS™, it may be permissible to provide one API set per platform. In the case where an OS is the Tizen™, it may be permissible to provide two or more API sets per platform.

The application 370 (e.g., the application program 147) may include, for example, one or more applications capable of providing functions for a home 371, a dialer 372, an SMS/MMS 373, an instant message (IM) 374, a browser 375, a camera 376, an alarm 377, a contact 378, a voice dial 379, an e-mail 380, a calendar 381, a media player 382, an album 383, and a timepiece 384, or for offering health care (e.g., measuring an exercise quantity or blood sugar) (not shown) or environment information (e.g., information of barometric pressure, humidity, or temperature) (not shown).

According to an embodiment, the application 370 may include an application (hereinafter referred to as "information exchanging application" for descriptive convenience) to support information exchange between the electronic device (e.g., the electronic device 101) and an external electronic device (e.g., the first electronic device 102 or the second electronic device 104). The information exchanging application may include, for example, a notification relay application for transmitting specific information to the external electronic device, or a device management application for managing the external electronic device.

For example, the information exchanging application may include a function of transmitting notification information, which is generated from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external device itself (or a part of components) or adjustment of brightness (or resolution) of a display) of the external electronic device which communicates with an electronic device, an application running in the external electronic device, or a service (e.g., a call service, a message service, or the like) provided from the external device.

According to an embodiment, the application 370 may include an application (e.g., a health care application of a mobile medical device, or the like) which is assigned in accordance with an attribute of the external electronic device. According to an embodiment, the application 370 may include an application which is received from an external electronic device (e.g., the first electronic device 102, the second electronic device 104, or the server 106). According to an embodiment, the application 370 may include a preloaded application or a third party application which is downloadable from a server. The element titles of the program module 310 according to the embodiment may be modifiable depending on kinds of OSs.

According to various embodiments, at least a part of the program module 310 may be implemented by software, firmware, hardware, or a combination of two or more thereof. At least a part of the program module 310 may be implemented (e.g., executed), for example, by a processor (e.g., the processor 210). At least a portion of the program module 310 may include, for example, a module, a program, a routine, sets of instructions, or a process for performing one or more functions.

Figure 4A:
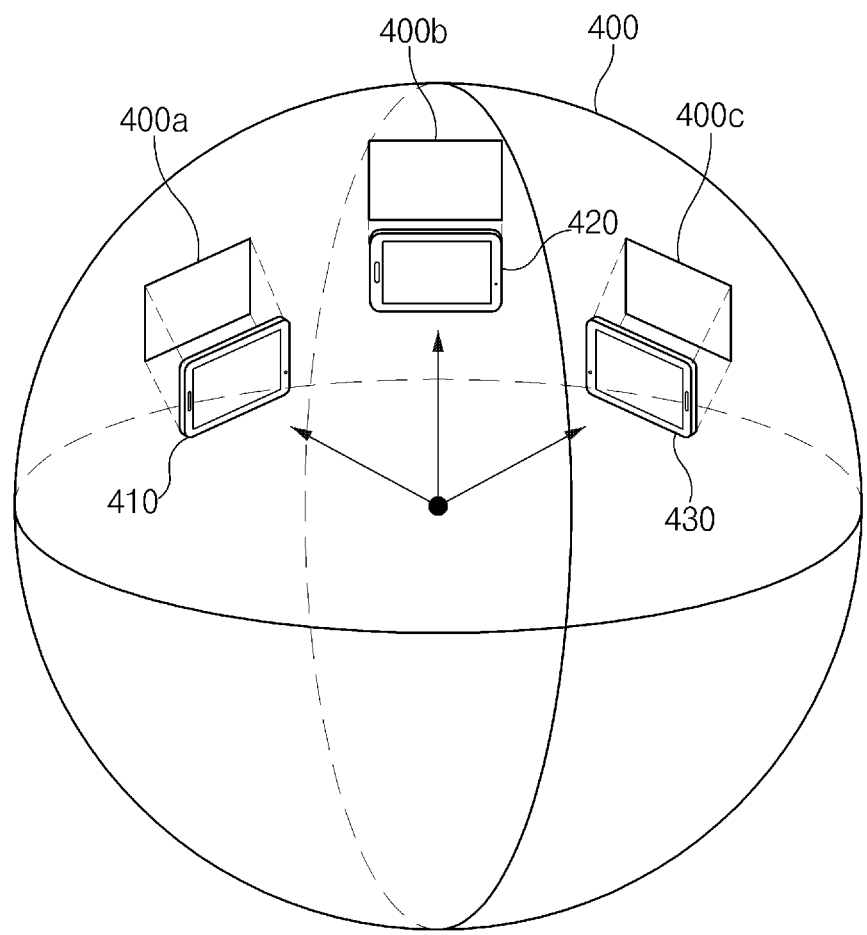
FIG. 4A is a diagram illustrating an example in which one area of an omnidirectional image is provided through a screen of an electronic device by an electronic device, according to various example embodiments of the present disclosure.

FIG. 4A is a diagram illustrating an example in which one area of an omnidirectional image is provided through a screen of an electronic device by an electronic device, according to various example embodiments of the present disclosure.

Each of electronic devices 410, 420, and 430 may provide an omnidirectional image 400 through a screen of each of the electronic devices 410, 420, and 430. The omnidirectional image 400 may be stored in a memory of each of the electronic devices 410, 420, and 430 or may be received from a content server (not illustrated) in real time in a streaming scheme.

In FIG. 4A, the omnidirectional image 400 may illustrate an environment surrounding a user. The omnidirectional image 400 is illustrated as being a spherical form. However, an embodiment of the present disclosure is not limited thereto. For example, the omnidirectional image 400 is illustrated as being various forms such as a panorama image of a cylindrical form, and the like. According to various embodiments of the present disclosure, the omnidirectional image 400 may illustrate an environment on a virtual space.

Referring to FIG. 4A, the omnidirectional image 400 may have a size that is larger than the screen of each of the electronic devices 410, 420, and 430. Each of the electronic devices 410, 420, and 430 may provide only a partial area of the omnidirectional image 400 through the screen of each of the electronic devices 410, 420, and 430. For example, the first electronic device 410 may provide a first area 400a of the omnidirectional image 400 through the screen of the first electronic device 410. The second electronic device 420 may provide a second area 400b of the omnidirectional image 400 through the screen of the second electronic device 420. The third electronic device 430 may provide a third area 400c of the omnidirectional image 400 through the screen of the third electronic device 430.

According to various embodiments of the present disclosure, on the basis of a direction that the first electronic device 410 faces, the first electronic device 410 may provide the screen with the partial area of the omnidirectional image 400 corresponding to the direction. Information about the direction that the first electronic device 410 faces may be obtained through a sensor, for example, a gyro sensor (e.g., the gyro sensor 240B of FIG. 2) included in the first electronic device 410.

In the case where the first electronic device 410 is at a location where the second electronic device 420 is displayed in FIG. 4A, the second area 400b may be provided to the screen of the first electronic device 410. Similarly, if the first electronic device 410 is at a location where the third electronic device 430 is displayed in FIG. 4A, the third area 400c may be provided to the screen of the first electronic device 410. That is, the partial area of the omnidirectional image 400 corresponding to the direction that the first electronic device 410 faces may be displayed in the screen of the first electronic device 410 based on the direction.

In addition, in the case where the location of the first electronic device 410 moves to a location where the second electronic device 420 is displayed in FIG. 4A, at least one area of the omnidirectional image 400 located between the first area 400a and the second area 400b may be provided to the screen of the first electronic device 410 in real time. For example, the first electronic device 410 may obtain a change in a direction of the first electronic device 410 through a gyro sensor, or the like and may update the partial area of the omnidirectional image 400, which is to be displayed in the screen of the first electronic device 410 based on the change in the direction, in real time.

Above, it is described that the omnidirectional image 400 is a still image. However, the omnidirectional image 400 may be a video of which the center is fixed. According to various embodiments of the present disclosure, the omnidirectional image 400 may be a video of which the center is changed. The above-mentioned details will be described with reference to FIG. 4C.

Figure 4B:
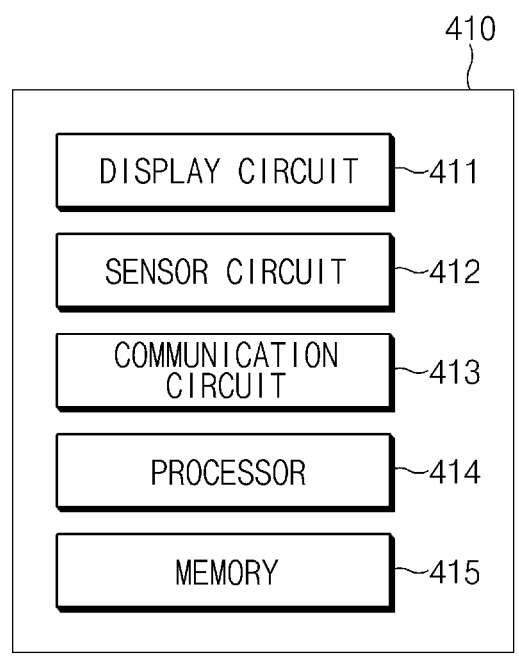
FIG. 4B is a block diagram illustrating an example electronic device, according to various example embodiments of the present disclosure.

FIG. 4B is a block diagram illustrating an example electronic device, according to various example embodiments of the present disclosure.

Referring to FIG. 4B, the electronic device 410 may include a display circuit 411, a sensor circuit 412, a communication circuit 413, a processor (e.g., including processing circuitry) 414, and a memory 415. A configuration of the electronic device 410 illustrated in FIG. 4B is merely an example and may be variously changed or modified. For example, the electronic device 410 may further include a user interface for receiving any instruction or information from a user. In this case, the user interface may be generally an input device such as a keyboard, a mouse, or the like and may be a graphic user interface (GUI) displayed in a screen of the electronic device 410.

According to various embodiments of the present disclosure, the display circuit 411 may display at least one content in the screen of the electronic device 410. The displayed content may include an image, a video, an application icon, an application execution screen, or the like.

An operation in which the display circuit 411 displays the content may be executed by the processor 414.

The sensor circuit 412 may obtain various pieces of information about the electronic device 410 and/or the periphery of the electronic device 410 through at least one or more sensors (e.g., the sensor circuit 240 of FIG. 2) included in the electronic device 410.

The communication circuit 413 may transmit or receive data to or from the outside (e.g., a content server storing an omnidirectional image and an omnidirectional video, or the like) over a network (e.g., the network 162 of FIG. 1). According to various embodiments of the present disclosure, the processor 414 may receive an image in the first area from the content server through the communication circuit 413 in various schemes. For example, the processor 414 may receive an image in the partial area of the omnidirectional image corresponding to the direction, which the electronic device 410 faces, and an image of the periphery of the partial area from the content server. In this case, the processor 414 may first receive the image of the periphery of the partial area. Furthermore, for example, the processor 414 may primarily receive the image in the partial area from the content server at a lower resolution. If the image in the partial area is a high resolution image, the processor 414 may partially receive the image of the area in advance.

Moreover, the processor 414 may include various processing circuitry and first receive an image corresponding to a direction in which the user mainly watches. Also, in the case where the electronic device 410 is stopped for a specific time period or more, the processor 414 may receive an image of the periphery of the partial area in advance.

The processor 414 may be implemented with, for example, a system on chip (SoC) and may include various processing circuitry, such as, for example, and without limitation, one or more of a dedicated processor, a central processing unit (CPU), a graphic processing unit (GPU), an image signal processor, an application processor (AP), and a communication processor (CP). The processor 414 may load an instruction or data, which is received from at least one of other elements (e.g., the display circuit 411, the sensor circuit 412, or the communication circuit 413), from the memory 415, may process the instruction or the data, and may store various pieces of data in the memory 415.

The processor 414 may provide the omnidirectional image through the display circuit 411. The omnidirectional image may be, for example, a still image (an image) or a video (a combination of an image) having a size that is larger than the screen of the electronic device 410. Accordingly, a part of the omnidirectional image may be displayed in the screen.

According to various embodiments of the present disclosure, the omnidirectional image may be implemented in the form such as a spherical form, a cylindrical form, or the like.

The processor 414 may provide a first area, which is a part of the omnidirectional image, to the screen through the display circuit 411. For example, in the case where the omnidirectional image is an omnidirectional still image, the processor 414 may provide the first area, which is a part of the omnidirectional still image, to the screen. In the case where the omnidirectional image is an omnidirectional video including a plurality of omnidirectional still images, the processor 414 may provide the first area being a part of the omnidirectional still image, which corresponds to a playing time stamp of the omnidirectional video, from among the plurality of omnidirectional still images included in the omnidirectional video. The above-mentioned description will be given in FIG. 4C. However, the omnidirectional video may include the different plurality of omnidirectional still images each of which the center is changed, and one area of each of the plurality of omnidirectional still images may be provided to the screen in process of time. The embodiment will be described in detail with reference to FIG. 4C.

According to various embodiments of the present disclosure, the omnidirectional video may include an omnidirectional still image of which the center is fixed, and an area of the omnidirectional still image to be provided to the screen may be changed with the center of the omnidirectional still image fixed (refer to FIG. 4A).

According to various embodiments of the present disclosure, the processor 414 may provide the first area by checking the first area from the memory 415. The processor 414 may provide the first area obtained from the content server through the communication circuit 413.

While providing the omnidirectional image, the processor 414 may obtain information about a change in a direction, which the electronic device 410 faces, through the sensor circuit 412 (e.g., a gyro sensor, or the like). For example, the direction of the electronic device 410 may be changed by moving a hand with which the user grips the electronic device 410. For example, the user may rotate his/her head while the user mounts the electronic device 410 on his/her head or while the user mounts another electronic device in which the electronic device 410 is mounted, and thus the direction of the electronic device 410 may be changed.

The processor 414 may provide a second area, which is another part of the omnidirectional image, to the screen through the display circuit 411 based on the obtained information about a change in the direction. For example, the processor 414 may substantially and sequentially display areas between the first area and the second area from the first area, which is being displayed immediately before, and may finally display the second area.

In the case where the omnidirectional image is the omnidirectional video including the plurality of omnidirectional still images, the processor 414 may provide the second area being a part of the omnidirectional still image, which corresponds to a playing time stamp of the omnidirectional video when the direction of the electronic device 410 is changed, from among the plurality of omnidirectional still images included in the omnidirectional video. In this case, a distance between the first area and the second area may correspond to the variation in the obtained direction.

In the case where the second area is received from the content server, the processor 414 may transmit information about the obtained omnidirectional image, information about the obtained direction change, and information about the first area (e.g., coordinate information of the first area in the omnidirectional image, directional information of the electronic device 410 at a time point when the first area is provided, and the like) to the content providing server through the communication circuit 413 to provide the second area. In this case, the content server may match pieces of information received from the electronic device 410 with each other and may store the matched pieces of information.

The processor 414 may correlate the time point of the direction change with a time point or a frame, when the omnidirectional image is provided, and may store the correlated time point of the direction change in the memory 415.

According to various embodiments of the present disclosure, in the case where the processor 414 receives a user input for requesting a pause of the omnidirectional video, the processor 414 may pause the omnidirectional video in addition to the time point of the direction change based on the user input, may correlate the pause time stamp with the time point or the frame when the omnidirectional image is provided, and may store the correlated pause time stamp in the memory 415.

As described above, since the omnidirectional image is larger than the screen of the electronic device 410 and an area of the omnidirectional image provided to the screen is changed according to the direction change of the electronic device 410, the processor 414 may provide the screen with another area, which is entirely different from the area, based on the direction change of the electronic device 410 even with regard to one omnidirectional video. For example, a raw omnidirectional image (a raw omnidirectional image stored in the memory 415 or stored in the content server) to be a source image may be provided as a plurality of sequences. Each sequence may be a group of a plurality of omnidirectional still images (frames).

For example, the raw omnidirectional video may include a first sequence that is composed of a plurality of omnidirectional still images corresponding to a first direction of the electronic device 410. In addition, the raw omnidirectional video may include a second sequence that is composed of a plurality of omnidirectional still images corresponding to a second direction of the electronic device 410. Accordingly, in the case where the direction of the electronic device 410 changes from the first direction to the second direction at a time point, the processor 414 may provide the first sequence to the screen until immediately before the time point and may provide the second sequence to the screen after the time point. Furthermore, a combination of the first sequence and the second sequence provided to the screen may be stored in the memory 415 as a third sequence. In addition, the third sequence may be transmitted to the content server through the communication circuit 413. The processor 414 may process at least a portion of information about the raw omnidirectional video, information about the first sequence, information about the second sequence, information about the first direction, information about the second direction, information about the direction change, and information about the time point of the direction change.

According to various embodiments of the present disclosure, the omnidirectional image may be related to a 3D virtual reality game. For example, the user may mount a head mount display (HMD) mounting the electronic device 410 on his/her head, and the electronic device 410 and the HMD may provide the user with the virtual reality game. In the case where the processor 414 receives a user input for requesting the recording of the game from the user, the processor 414 may enter a recording mode. In this case, the processor 414 may record the virtual reality game that is played by the user. In addition, the processor 414 may synchronize a location of a player in the virtual reality game and a direction (the direction that the HMD faces), which the electronic device 410 faces, with a recording time of the recorded image and may store the synchronized result. In this case, the omnidirectional video corresponding to movement of the player in the virtual reality game may be separately generated.

The memory 415 may include an internal memory or an external memory. For example, the internal memory may include at least one of a volatile memory (e.g., a dynamic random access memory (DRAM), a static RAM (SRAM), or a synchronous DRAM (SDRAM)), a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like)), a hard disk drive (HDD), or a solid state drive (SSD).

The external memory may include a flash drive, for example, a compact flash (CF), a secure digital (SD), a micro-SD, a mini-SD, an extreme digital (xD), a multimedia card (MMC), or a memory stick, and the like. The external memory may be operatively and/or physically connected with the electronic device 410 through various interfaces.

It should be well understood to those skilled in the art that the display circuit 411, the sensor circuit 412, the communication circuit 413, the processor 414, and the memory 415 may be implemented independently of each other or two or more thereof are integrated.

Figure 4C:
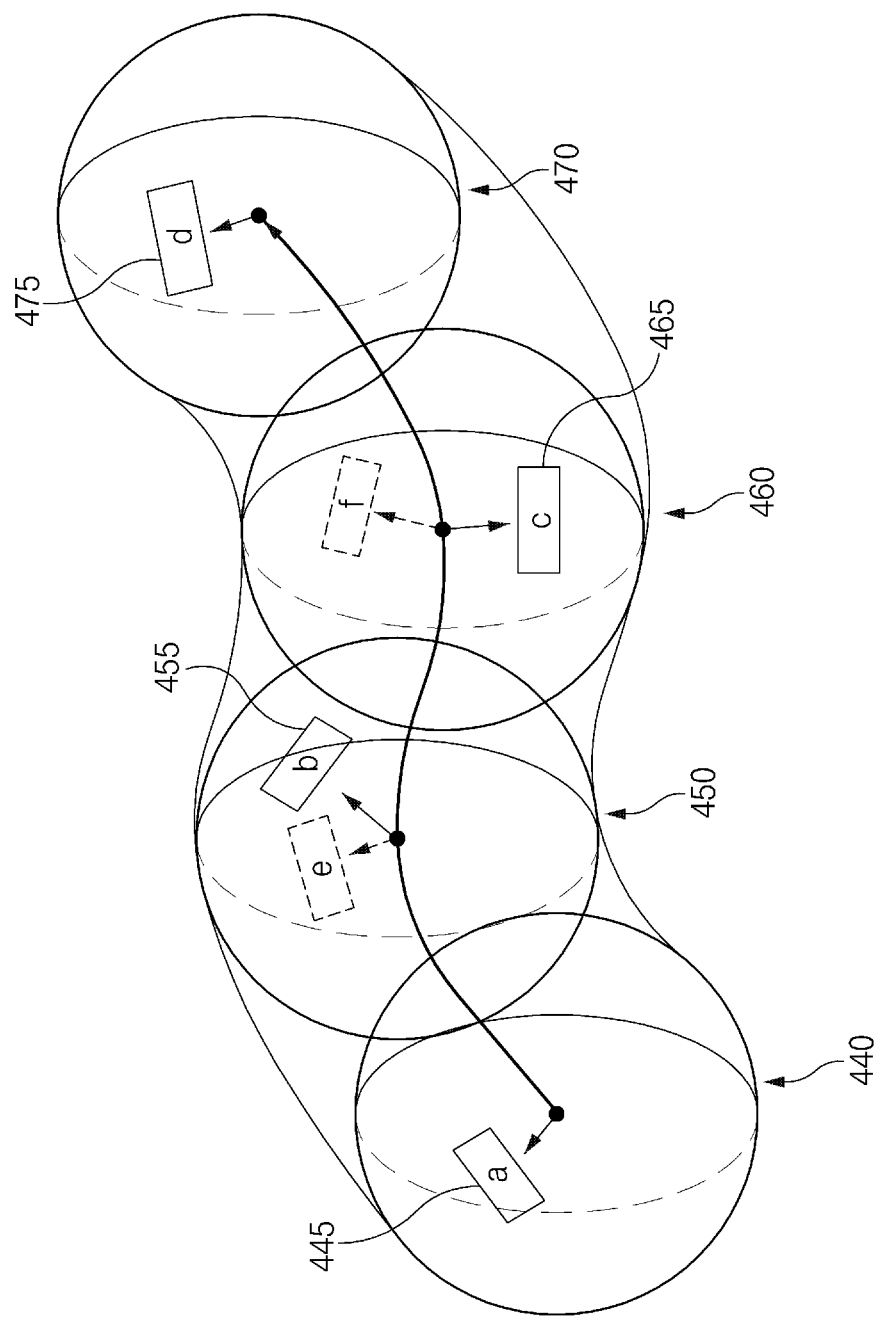
FIG. 4C is a diagram illustrating a plurality of omnidirectional images, according to various example embodiments of the present disclosure.

FIG. 4C is a diagram illustrating a plurality of omnidirectional images, according to various example embodiments of the present disclosure.

Referring to FIG. 4C, a first omnidirectional image 440, a second omnidirectional image 450, a third omnidirectional image 460, and a fourth omnidirectional image 470 in each of which the center is changed are illustrated. The first omnidirectional image 440, the second omnidirectional image 450, the third omnidirectional image 460, and the fourth omnidirectional image 470 may be images of which the centers are different from each other, respectively. Coordinates of each of the centers may be stored. The coordinates of the center may be location information obtained through a GPS. For example, in the case where the electronic device 410 is located at the center of the first omnidirectional image 440, the first omnidirectional image 440 may be provided to the electronic device 410.

Each of the first omnidirectional image 440, the second omnidirectional image 450, the third omnidirectional image 460, and the fourth omnidirectional image 470 illustrated in FIG. 4C may be the omnidirectional image of which the coordinates are located on the movement trajectory of the electronic device 410. For example, the electronic device 410 may move from the center of the first omnidirectional image 440 to the center of the fourth omnidirectional image 470.

An arrow illustrated in each of the first omnidirectional image 440, the second omnidirectional image 450, the third omnidirectional image 460, and the fourth omnidirectional image 470 may be a gaze direction of the electronic device 410 when the electronic device 410 is located at the center of each of the first omnidirectional image 440, the second omnidirectional image 450, the third omnidirectional image 460, and the fourth omnidirectional image 470. For example, when the electronic device 410 is located at the center of the first omnidirectional image 440, the electronic device 410 may face an area 'a' 445. When located at the center of the second omnidirectional image 450, the electronic device 410 may face an area 'b' 455. When located at the center of the third omnidirectional image 460, the electronic device 410 may face an area 'c' 465. When located at the center of the fourth omnidirectional image 470, the electronic device 410 may face an area 'd' 475.

According to various embodiments of the present disclosure, the electronic device 410 outputting an omnidirectional image may sequentially output the area 'a' 445 of the first omnidirectional image 440, the area 'b' 455 of the second omnidirectional image 450, the area 'c' 465 of the third omnidirectional image 460, and the area 'd' 475 of the fourth omnidirectional image 470 based on movement of the electronic device 410. While the electronic device 410 outputting the omnidirectional image is moving, for example, in the case where the electronic device 410 is rotated at a point in time when the electronic device 410 is located at the center of the second omnidirectional image 450, the electronic device 410 may output an area 'e'. As another example, in the case where the electronic device 410 is rotated at a point in time when the electronic device 410 is located at the center of the third omnidirectional image 460, the electronic device 410 may output an area T. The electronic device 410 may store information about the rotation. In the case where the electronic device 410 plays the omnidirectional image again, the electronic device 410 may sequentially output the area 'a' 445 of the first omnidirectional image 440, the area 'e' of the second omnidirectional image 450, the area 'f' of the third omnidirectional image 460, and the area 'd' 475 of the fourth omnidirectional image 470 based on the information about the rotation.

The new omnidirectional image may include location information, time information, and directional information for each frame. Furthermore, the new omnidirectional image may further include field of view (FOV) information, and expanding information (zoom-in information and zoom-out information) for each frame.

In FIG. 4C, four omnidirectional images (the first omnidirectional image 440, the second omnidirectional image 450, the third omnidirectional image 460, and the fourth omnidirectional image 470) based on the movement trajectory of the electronic device 410 are illustrated. However, there may be a lot of omnidirectional images in the movement trajectory.

Figure 5A:
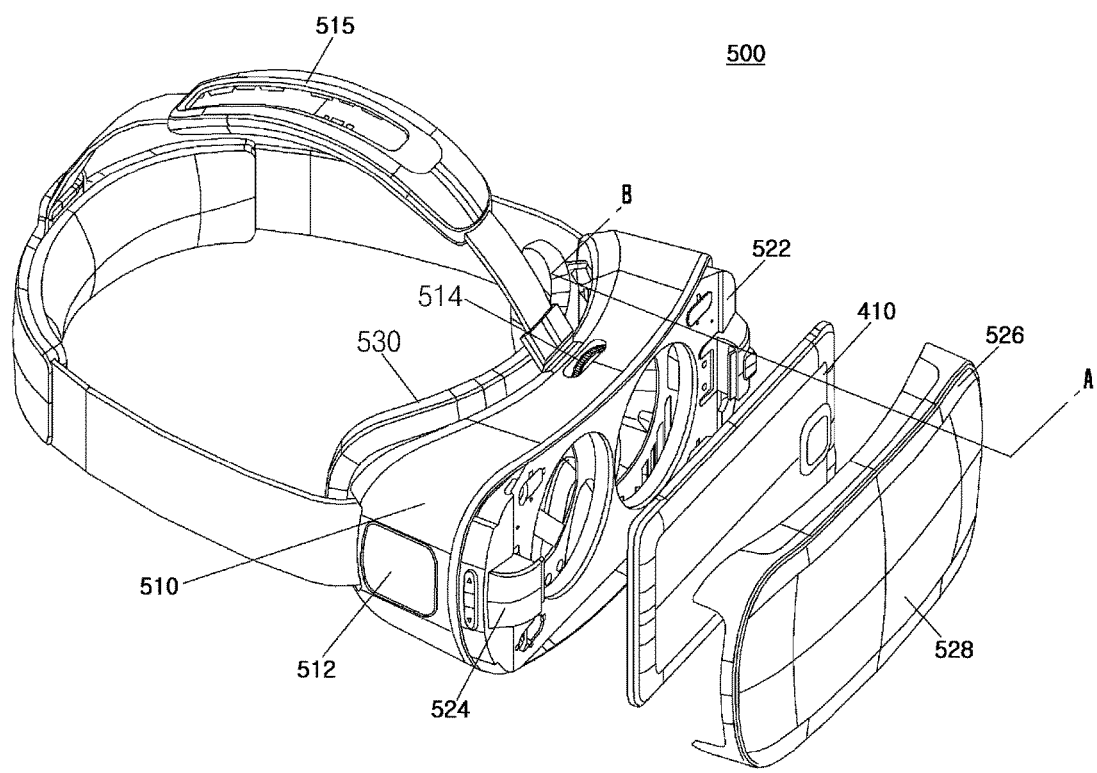
FIG. 5A is an exploded perspective view illustrating an example configuration of an external device, according to various example embodiments of the present disclosure.
Figure 5B:
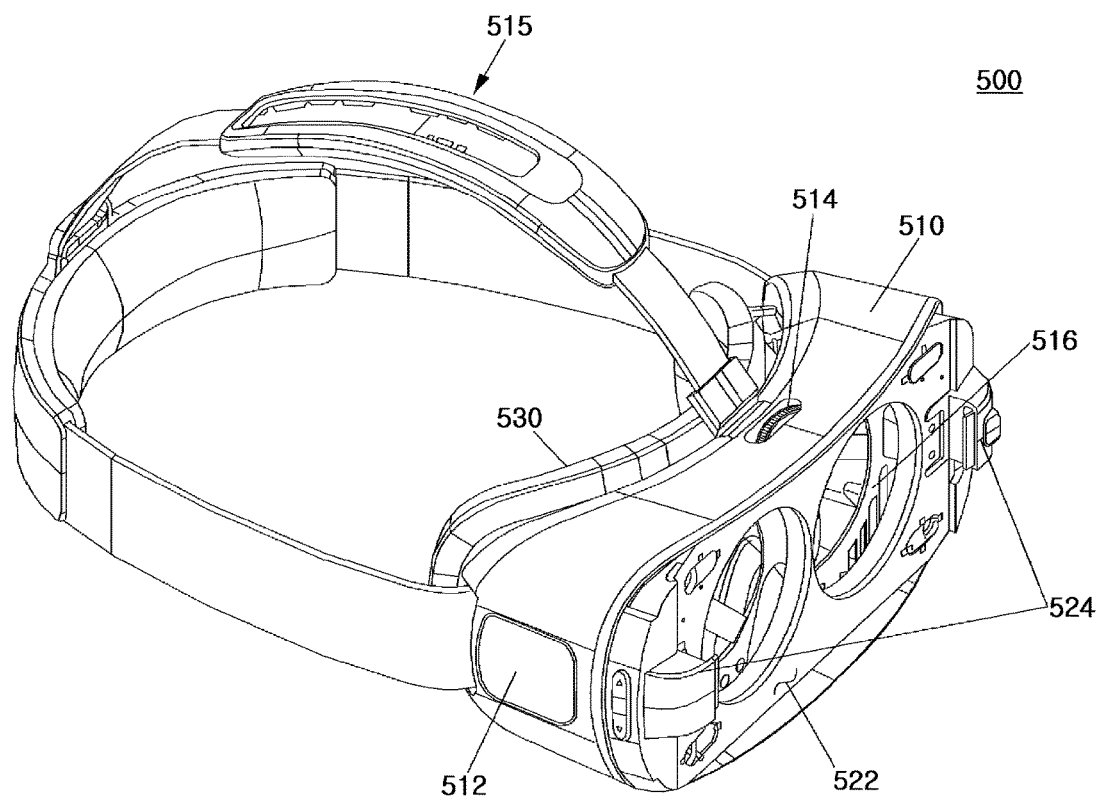
FIG. 5B is a perspective view illustrating an example main frame in a state where an external device of FIG. 5A is not coupled to an electronic device, according to various example embodiments of the present disclosure.
Figure 5C:
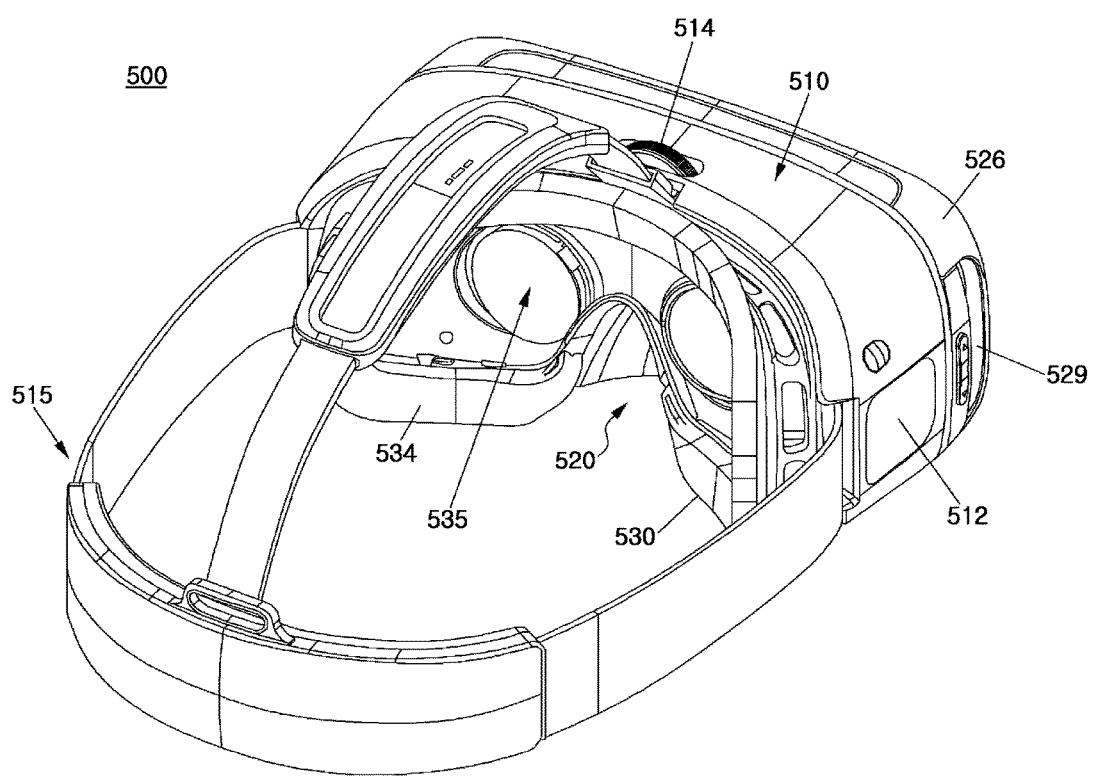
FIG. 5C is a rear perspective view of FIG. 5B in a state where an electronic device and a cover are coupled, according to various example embodiments of the present disclosure.

FIG. 5A is an exploded perspective view illustrating an example configuration of an external device according to various example embodiments of the present disclosure. FIG. 5B is a perspective view illustrating an example main frame in a state where an external device of FIG. 5A according to various example embodiments of the present disclosure is not coupled to an electronic device. FIG. 5C is a rear perspective view of FIG. 5B in a state where an electronic device and a cover are coupled, according to various example embodiments of the present disclosure.

Referring to FIG. 5A, the electronic device 410 may be located between an external device 500 and a cover of the external device 500 and may be coupled to the external device 500. Even though not illustrated in FIG. 5A, the electronic device 410 and the external device 500 may be connected with each other through a connector (e.g., the input/output interface 150 of FIG. 1), a communication module (e.g., the communication interface 170 of FIG. 1), or the like and may exchange data with each other.

According to an embodiment illustrated in FIG. 5A, the electronic device 410 and the external device 500 may operate in conjunction with each other and may perform a specific operation. According to various embodiments of the present disclosure, the electronic device 410 and the external device 500 may be one wearable electronic device, which is coupled to the electronic device 410 and the external device 500, and may perform a specific operation.

Referring to FIGS. 5A to 5C, the external device 500 according to various embodiments of the present disclosure may include a main frame 510 and a support part 515 (e.g., a goggle band).

The main frame 510 may be mounted in at least a portion (e.g., a facial side) of a face of a user and may be supported on the facial side of the user by various elements.

In an embodiment, the support part 515 may include a band formed of an elastic material. The face plate may adhere to around eyes of the user by adjusting the length of the band. A plurality of cushions may be attached to the band to provide the user with comfortable wearing in consideration of extended wearing.

Additionally or alternatively, the support part 515 may be implemented with eyeglass temples, helmets, straps, or the like.

A rear side of the main frame 510 may be a facial side contact part 530 that is a part contacting user's facial side. The facial side contact part 530 may have a structure corresponding to curvature of user's facial side and may include an elastic body 534.

When the facial side contact part 530 contacts user's facial side, the elastic body 534 may include at least one cushion material like a sponge so as to provide the user with the comfortable wearing. The elastic body 534 may be implemented with one sponge or may include two or more sponges of which compression rates are different from each other. For example, the elastic body 534 may be a sponge that is stacked with three layers (e.g., an upper layer, a middle layer, and a lower layer). In this case, each of the upper and lower layers may be implemented with a sponge of which the compression rate is low, and the middle layer may be implemented with a sponge of which the compression rate is high.

According to another embodiment, the elastic body 534 may be attached to the main frame 510 so as to be separated from the main frame 510. An adhesive member may be located in one side of the elastic body 534. The elastic body 534 may be attached to the main frame 510 through the adhesive member. The adhesive member may include Velcro, a tape, an adhesive, or the like, and may not be limited thereto. For example, the adhesive member may be implemented with various materials that make it possible to be detachable. By adopting the separable elastic body 534, in the case where several users use the one external device 500, each user may select an elastic body that fits his/her well (e.g., in the case where there are a grown-up and a child whose facial sides are different from each other). By adopting the separable elastic body 534, the elastic body 534 may be easily replaced when a surface of the elastic body 534 is contaminated (e.g., cosmetics in the case of a female) or the elastic body 534 is damaged due to frequent use.

Accordingly, the external device 500 according to an embodiment of the present disclosure may be easily worn on user's facial side. For example, even though a shape or structure of the main frame 510 has an appearance that covers user's eyes, the main frame 510 may include a nose recess 520 such that user's nose is exposed.

A lens assembly that includes at least one lens may be inserted into a portion of the facial side contact part 530, which is a location which two eyes of the user face.

When the user wears the external device 500 of the present disclosure, at least one side of a lens 535 may be exposed to the facial side contact part 530 such that the user watches a screen of a display device with user's eye.

Furthermore, the main frame 510 may be implemented with a material which is light enough for the user to feel comfortable wearing, and is able to support the electronic device 410, for example, a plastic material.

Furthermore, the main frame 510 may further include a material for protecting the external device 500 according to an embodiment of the present disclosure.

According to another embodiment, a protection material may include various materials for the strength and beauty, for example, at least one of glass, plastic (e.g., acrylonitrile butadiene styrene (ABS), polycarbonate), ceramic, metal (e.g., aluminum) or metal alloy (e.g., steel, stainless steel, titanium, or magnesium alloy).

The main frame 510 may include a touch pad 512, a display location adjustment unit 514, and a lens fixing part 516 and may include a front case 522 that includes a space or structure for coupling the electronic device 410 in front of the external device 500.

The main frame 510 may further include a connector for communicating with the coupled electronic device 410.

In an embodiment, the connector may include an electronic connector of the electronic device 410, for example, a USB connector that is capable of being connected to a USB port and may provide the electronic device 410 with a signal of the graphical user interface, which will be described later, through an electronic connector of the USB connector.

The front case 522 of the main frame 510 may correspond to an outer shape of the electronic device 410.

In an embodiment, the front case 522 may include an elastic material or a flexible material, and thus the front case 522 may accommodate various sizes of the electronic devices 410 by adjusting the size of the front case 522.

In a state where the electronic device 410 is coupled to the main frame 510, the external device 500 according to various embodiments of the present disclosure may further include a cover 526, which is coupled such that the electronic device 410 is coupled to the main frame 510 more firmly.

The cover 526 may be physically connected to the main frame 510 by a hook or the like, and may be coupled by a magnet or an electromagnet.

As such, the cover 526 may prevent the electronic device 410 from being separated from the main frame 510, may constitute an appearance of the main frame 510, and may improve aesthetics.

The cover 526 may additionally include a window 528 in front of the cover 526, and the window 528 may improve the aesthetics through various forms of materials, colors, or the like.

The window 528 may be implemented with a general plastic material such as polycarbonate (PC) and acrylic, may be implemented with a ceramic material such as glass, sapphire, transparent ceramic, or the like, and may be implemented with a metal material such as aluminum, steel use stainless (SUS), or the like. The window 528 may include a color, and transparency of the window 528 may be adjusted.

Furthermore, the cover 526 may additionally include one or more openings 529. The opening 529 may easily emit heat, which is generated at the electronic device 410, to the outside of the cover 526 and may decrease temperature of a terminal, thereby preventing the performance of the terminal from degrading.

In addition, the one or more openings 529 may reduce the weight of the external device 500 by lightening the weight of the cover 526.

A display or the transparent/translucent lens 535 may be fixed in the lens fixing part 516 of the main frame 510 as an integral type or may be fixed to be detachable.

According to an embodiment, a lens assembly may be inserted between the display and user's eye.

In the rear side of the main frame 510, a smooth material (e.g., sponge, rubber, and the like) may be included to prevent the main frame 510 from sticking on around user's eye excessively.

According to an embodiment, the main frame 510 may include a control device or a user input module for controlling the electronic device 410.

The control device may include, for example, at least one of the touch pad 512 located in a side of the main frame 510, a physical key, a physical button, a touch key, a joystick, or a wheel key.

According to an embodiment, the touch pad 512 may display a GUI that is capable of controlling a function of the electronic device 410. For example, the GUI associated with sound settings may adjust a volume of an audio output from the electronic device 410, and a GUI associated with video playing may control a video displayed on the electronic device 410.

Furthermore, the touch pad 512 may receive a touch input of the user, for example, an input for directly touching the touch pad 512 or a hovering input.

Since the external device 500 according to an embodiment of the present disclosure is connected with the electronic device 410 by using an interface such as a USB and the like, the external device 500 may transmit a received touch input to the electronic device 410.

The electronic device 410 may control a function corresponding to the touch input in response to the touch input received from the external device 500. For example, the electronic device 410 may adjust a volume or may control the video playing, in response to the received touch input.

According to an embodiment, the display location adjustment unit 514 may be implemented in the form of a wheel or a dial.

If the user turns the wheel or the dial implemented as the display location adjustment unit 514, the electronic device 410 may move to adjust a distance between the display of the electronic device 410 and the user. Accordingly, the location of the electronic device 410 may be adjusted such that the user watches the displayed image that is suitable for his/her eyesight.

Meanwhile, the front case 522 of the main frame 510 may include a connecting part 524 that fixes the coupled electronic device 410.

Figure 5D:
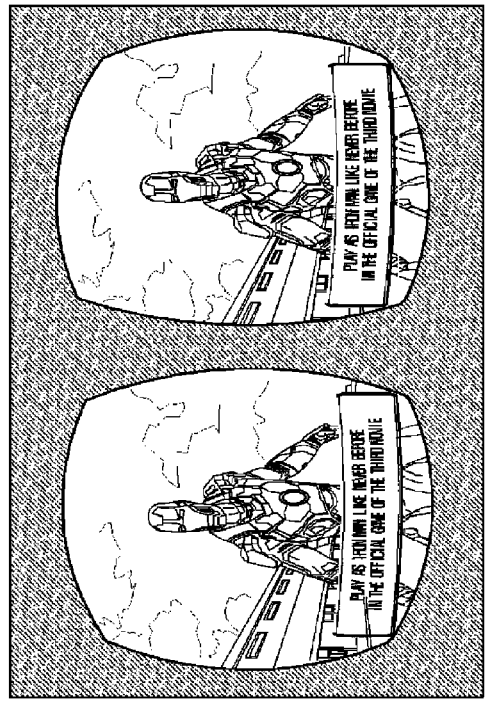
FIG. 5D is a diagram illustrating a normal mode and a HM mode or VR mode of an external device, according to various example embodiments of the present disclosure.
Figure 5D:
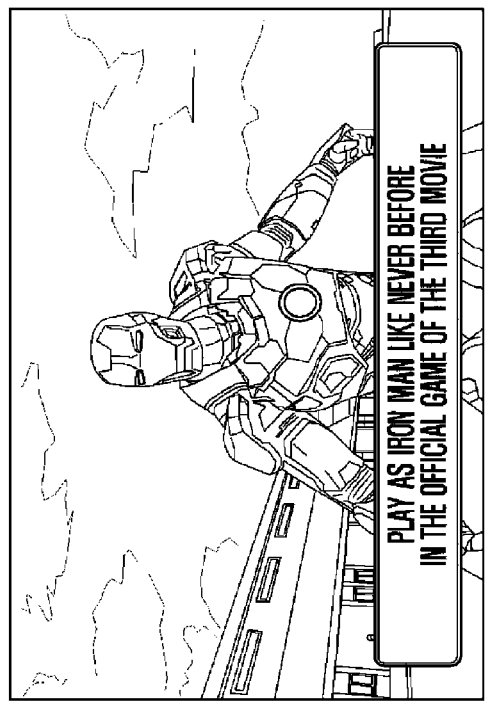

FIG. 5D is a diagram illustrating examples of a normal mode and a head-mounted mode (hereinafter referred to as "HM mode") (or VR mode) of an external device, according to various example embodiments of the present disclosure.

The HM mode or the VR mode may be a mode that provides at least one of a see-through function, which provides augmented reality (AR), and a see-closed function, which provides virtual reality (VR), through the display. For example, in the case where the electronic device 410 mounted on the external device 500 is operated, the normal mode may be switched to the HM mode or the VR mode. In the HM mode or the VR mode, one image may be split into two images and may be expressed. According to an embodiment, in the HM mode or VR mode, since the image is distorted by the lens 535 included in the main frame 510, a planar image may be inversely distorted according to the characteristics of the lens 535 to provide an undistorted image to the user.

Figure 5E:
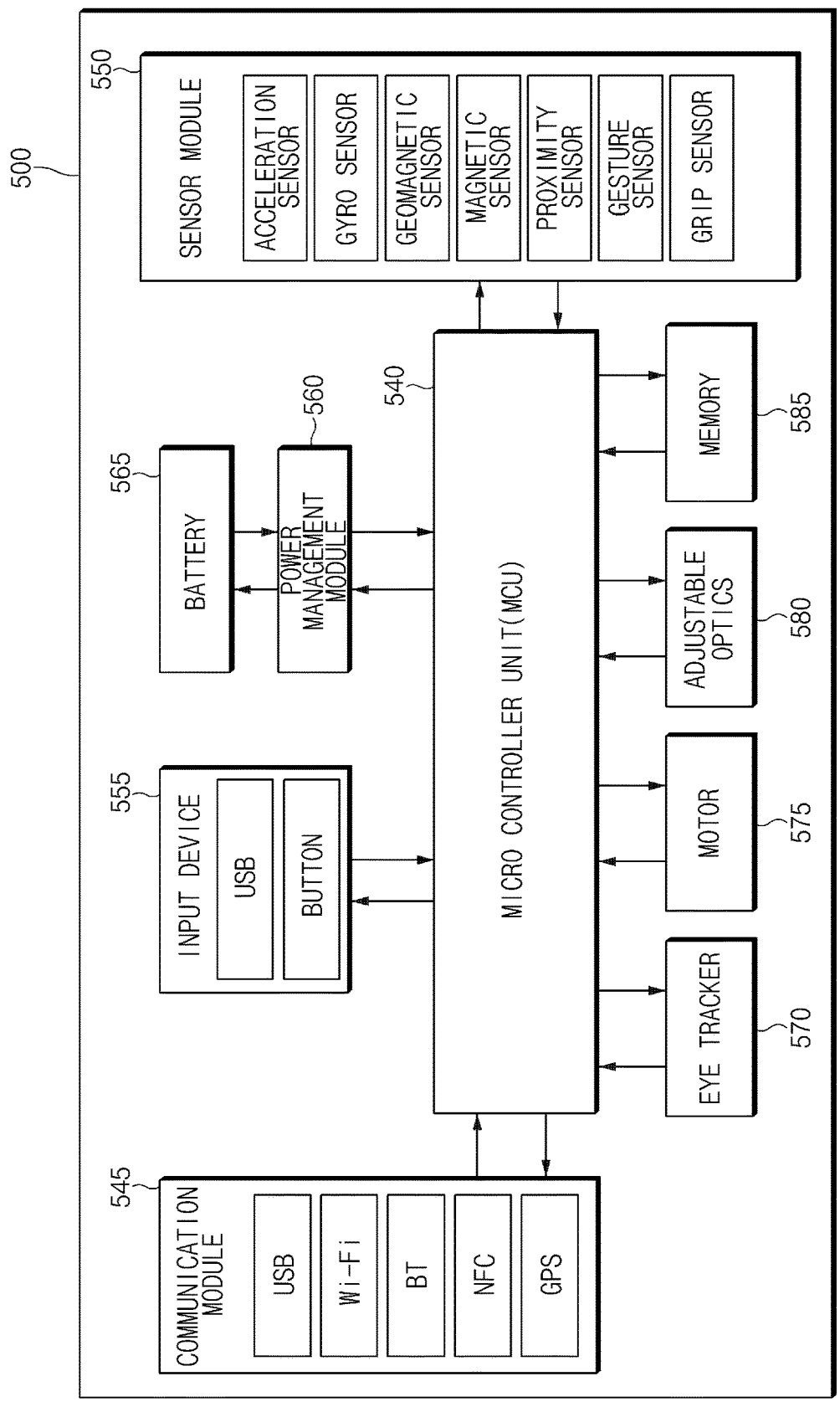
FIG. 5E is a block diagram illustrating an example configuration of an external device, according to various example embodiments of the present disclosure.

FIG. 5E is a block diagram illustrating an example configuration of an external device 500, according to various example embodiments of the present disclosure.

Referring to FIG. 5E, the external device 500 according to various embodiments of the present disclosure may include a micro controller unit (MCU) (e.g., including controller and/or processing circuitry) 540, a communication module (e.g., including communication circuitry) 545, a sensor module 550, an input device (e.g., including input circuitry) 555, a power management module 560, a battery 565, an eye tracker 570, a vibrator (e.g., a motor) 575, an adjustable optics (or a lens assembly) 580, and a memory 585.

In the block diagram, other elements (e.g., a display) are not illustrated for descriptive convenience.

In another embodiment, a part of elements illustrated in the block diagram may be included in the main frame 510, and the other part may be included in the electronic device 410 (e.g., a detachable smartphone).

The MCU 540 may include various circuitry, such as, for example, and without limitation, a processor and may control a plurality of hardware elements connected to the MCU 540 by driving an operating system (OS) or an embedded software program.

The communication module 545 may include various communication circuitry and electrically connect the main frame 510 of the external device 500 with the electronic device 410, for example, a smartphone, by using wired and/or wireless communication and may exchange data.

According to an embodiment, the communication module 545 may include a USB module, a Wi-Fi module, a BT module, a NFC module, and a GPS module.

According to another embodiment, at least a part (e.g., two or more) of the Wi-Fi module, the BT module, the GPS module, or the NFC module may be included within one Integrated Circuit (IC) or an IC package.

The sensor module 550 may measure a physical quantity or may detect an operation state of the external device 500. The sensor module 550 may convert the measured or detected information to an electric signal. For example, the sensor module 550 may include at least one of an acceleration sensor, a gyro sensor, a geomagnetic sensor, a magnetic sensor, a proximity sensor, a gesture sensor, a grip sensor, or a biometric sensor.

The sensor module 550 may detect the movement of a head of a user, who wears the external device 500, by using the acceleration sensor, the gyro sensor, the geomagnetic sensor, and the like.

The sensor module 550 may detect whether the user wears the external device 500, by using the proximity sensor or the grip sensor.

In an embodiment, at least a part of elements of the sensor module 550 may be included in the detachable electronic device 410

According to an embodiment, the sensor module 550 may detect whether the user wears the external device 500 by detecting at least one of variation of an IR, an applied pressure, or a capacitance (or dielectric permittivity).

The gesture sensor may detect the movement of a hand or a finger of the user and may recognize the detected movement as an input for the external device 500.

Additionally or alternatively, the sensor module 550 may recognize biometric information of the user by using a biometric sensor, for example, an E-nose sensor, an electromyography sensor (EMG) sensor, an electroencephalogram (EEG) sensor, an electrocardiogram (ECG) sensor, an iris sensor, or the like.

The sensor module 550 may further include a control circuit for controlling at least one or more sensors included therein.

The input device 555 may include various input circuitry, such as, for example, and without limitation, the touch pad 512 and a physical button. The touch pad 512 may detect a touch input based on at least one of capacitive, resistive, infrared and ultrasonic detecting methods. Also, the touch pad 512 may further include a control circuit. In the case of the capacitive detecting method, a physical contact or proximity recognition may be possible. The touch pad 512 may further include a tactile layer. In this case, the touch pad 512 may provide a tactile reaction to a user, and the button may include, for example, a physical button, an optical key, or a keypad, or the like, but is not limited thereto.

For example, the eye tracker 570 may track user's gaze by using at least one method of an electrical oculography (EOG) sensor, coil systems, dual purkinje systems, bright pupil systems, or dark pupil systems. Moreover, the eye tracker 570 may further include a micro camera for the eye tracking. The adjustable optics 580 may measure the interpupil distance (IPD) of a user and may adjust a distance of a lens and a location of the display of the electronic device 410 such that the user watches an image that is suitable for his/her eyesight.

The memory 585 may include an internal memory or an external memory. For example, the internal memory may include at least one of a volatile memory (e.g., a dynamic random access memory (DRAM), a static RAM (SRAM), or a synchronous DRAM (SDRAM)), or a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like). According to an embodiment, the internal memory may be a solid state drive (SSD). The external memory may further include a flash drive, for example, a compact flash (CF), a secure digital (SD), a micro secure digital (Micro-SD), a mini secure digital (Mini-SD), an extreme digital (xD), a memory stick, or the like. The external memory may be operatively connected to the external device 500 through various interfaces. According to an embodiment. The electronic device 500 may further include a storage device (or storage medium) such as a hard drive.

The memory 585 may store a command or data generated from the MCU 540, the communication module 545, the sensor module 550, and the input device 555. The memory 585 may include programming modules, such as a kernel, a middleware, an application programming interface (API), or an application.

The kernel may control or manage system resources (e.g., the MCU 540 or the memory 585) that are used to execute operations or functions of other programming modules (e.g., the middleware, the API, or the application) other than the kernel.

The kernel may provide an interface that allows the middleware, the API, or the application to access discrete elements of the external device 500 so as to control or manage.

The middleware may perform a mediation role such that the API or the application communicates with the kernel to exchange data. The middleware may perform control (e.g., scheduling or load balancing) for work requests using a method of assigning priority, which may use system resources (e.g., the MCU 540 or the memory 585) of the external device 500, to at least one application among the application, in connection with the work requests received from the applications.

The API is an interface that allows the application to control a function provided from the kernel or the middleware. For example, the API may include at least one interface or function (e.g., instruction) for file control, window control, image processing, text control, or the like.

The application may include an SMS/MMS application, an e-mail application, a calendar application, an alarm application, a health care application (e.g., application for measuring an exercise quantity or blood sugar), an environmental information application (e.g., application for providing information of barometric pressure, humidity, or temperature), or the like. Additionally or alternatively, the application may be an application related to information exchange between the external device 500 and the electronic device 410. For example, the information exchanging application may include a notification relay application for transmitting specific information to the electronic device 410 or a device management application for managing the electronic device 410.

For example, the notification relay application may include a function of transmitting notification information, which arises from other applications (e.g., applications for SMS/MMS, e-mail, health care, or environmental information) of the external device 500, to the electronic device 410. Additionally or alternatively, the notification relay application may receive notification information from the electronic device 410 and provide the notification information to a user. For example, the device management application may manage (e.g., install, delete, or update) at least a part of function (e.g., turn-on/turn-off of an external electronic device itself (or a part of components) or adjustment of brightness (or resolution) of a display) of the electronic device 410 that communicates with the external device 500, an application running in the external electronic device, or a service (e.g., a call service or a message service) provided from the external electronic device.

In FIGS. 5A to 5C, it is illustrated that the electronic device 410 and the external device 500 are separate elements. However, embodiments of the present disclosure are not limited thereto. For example, the electronic device 410 and the external device 500 may be integrated with one device. In addition, in FIGS. 5A to 5C, it is illustrated that the electronic device 410 coupled to the external device 500 is a smartphone. However, embodiments of the present disclosure are not limited thereto. For example, the electronic device 410 coupled to the external device 500 may be one of various types of mobile terminals. Furthermore, in FIGS. 5A to 5C, it is illustrated that the electronic device 410 is mounted in the external device 500. However, embodiments of the present disclosure are not limited thereto. For example, the external device 500 may operate together with an electronic device (e.g., a game module) that is located outside the external device 500 and that is electrically or operatively connected with the external device 500.

According to an embodiment, an electronic device may include a display circuit that provides a visual effect through a screen of the electronic device, a sensor circuit that obtains information about a status of the electronic device or a status of a periphery of the electronic device, a processor electrically connected with the display circuit and the sensor circuit, and a memory electrically connected with the processor. When executed by the processor, the memory stores instructions that cause the processor to provide an omnidirectional image having a size larger than the screen through the display circuit, to provide the screen with a first area being a partial area of the omnidirectional image, to obtain information about a change in a direction, which the electronic device faces, through the sensor circuit when the omnidirectional image is provided, to provide the screen with a second area being another partial area of the omnidirectional image through the display circuit based on the obtained information, and to store a time point, at which the direction is changed, such that the time point is correlated with a time point or a frame at which the omnidirectional image is provided.

According to another embodiment, the electronic device may further include a communication circuit that transmits or receives data to or from a content server. The instructions, when executed by the processor, may cause the processor to transmit the obtained information to the content server through the communication circuit.

According to another embodiment, the instructions, when executed by the processor, may cause the processor to receive data corresponding to the second area from the content server through the communication circuit.

According to another embodiment, the transmitted information may be stored in the content server.

According to another embodiment, the omnidirectional image may include at least a part of an omnidirectional still image or an omnidirectional video.

According to another embodiment, the instructions, when executed by the processor, may cause the processor to receive a user input for requesting a pause of the omnidirectional video, to pause the omnidirectional video based on the user input, and to store a pause time stamp together with the time point or the frame at which the omnidirectional image is provided.

According to another embodiment, the instructions, when executed by the processor, may cause the processor to provide the screen of the electronic device with the omnidirectional video including one area of the omnidirectional still image.

According to another embodiment, the instructions, when executed by the processor, may cause the processor to provide the screen of the electronic device with the omnidirectional video including one area of each of different omnidirectional still images.

According to another embodiment, the instructions, when executed by the processor, may cause the processor to provide the screen of the electronic device with the one area of each of the different omnidirectional still images included in the omnidirectional video regardless of the change in the direction of the electronic device, if the omnidirectional image is the omnidirectional video.

According to an embodiment, an electronic device may include a housing including a first surface, a display device including at least one screen exposed through the first surface, a coupling structure connected with the housing to detachably mount the housing on a head of a user such that the first surface faces eyes of the user, a wired and/or wireless communication interface, a sensor that senses a movement of the housing, a processor electrically connected with the display device, the wired and/or wireless communication interface, and the sensor, and a memory electrically connected with the processor. When executed by the processor, the memory stores instructions, may cause the processor to receive, via the wired and/or wireless communication interface, first video data including a first sequence of first partial images, each of which is a preselected portion of a respective full image, to display a video on the screen based on the received first video data, to transmit, via the wired and/or wireless communication interface, directional information, which is detected by using the sensor, about the movement of the housing, to receive, via the wired and/or wireless communication interface, a second sequence of second partial images, each of which is a part of the respective full image, the part being selected in response to the directional information, and to display the video on the screen based on the received second video data.

According to another embodiment, the first video data may further include metadata indicating locations at which the first partial images occupy the full image. The instructions may cause the processor to generate the directional information by using at least a portion of the metadata.

According to another embodiment, the full image may be formed as an image in 360 degrees from a viewer's perspective.

According to another embodiment, the full image may be formed as an image in less than 360 degrees from a viewer's perspective.

According to another embodiment, the sensor may include a gyro sensor.

According to another embodiment, the wired and/or wireless communication interface may support to transmit or receive data of 4K or higher.

According to an embodiment, an electronic device may include a first communication interface connected with an external display device, which includes a motion sensor, in a wired or wireless manner, a second communication interface connected with an external media source in the wired or wireless manner, a processor electrically connected with the first communication interface and the second communication interface, and a memory electrically connected with the processor. When executed by the processor, the memory may store instructions that cause the processor to receive, via the second communication interface, first video data including a first sequence of first partial images, each of which is a preselected portion of a respective full image, to transmit, via the first communication interface, a video stream to the external display device based on the received first video data, to receive, via the first communication interface, directional information, which is detected by using the motion sensor, about a movement of the external display device, to transmit, via the second communication interface, the directional information, to receive, via the second communication interface, a second sequence of second partial images, each of which is a part of the respective full image, the part being selected in response to the directional information, and to transmit, via the first communication interface, a video stream to the external display device based on the received second video data.

According to another embodiment, the external display device may include a head mount display (HMD) device.

According to another embodiment, the electronic device may be a device different from the HMD device and is connected with the HMD device in the wired manner.

According to an embodiment, an electronic device may include a housing including a first surface, a touch screen exposed through the first surface, a wireless communication circuit, a processor electrically connected with an interface electrically connected with a connector included in an external frame, which is detachably mounted on a head of the user such that the touch screen faces eyes of a user while supporting the electronic device and which includes a motion sensor, the touch screen, the wireless communication circuit, and a communication circuit, and a memory electrically connected with the processor. When executed by the processor, the memory stores instructions that cause the processor to receive, via the wireless communication circuit, first video data including a first sequence of first partial images, each of which is a preselected portion of a respective full image, to display a video on a screen based on the received first video data, to receive, via the wireless communication circuit, directional information about a movement of a frame that is detected by using a motion sensor, to receive, via the communication circuit, a second sequence of second partial images, each of which is a part of a respective full image, the part being selected in response to the directional information, and to display the video on the screen based on the received second video data.

According to another embodiment, the electronic device may include a smartphone.

According to another embodiment, the directional information may include at least one of a gaze direction of a user or a movement direction of the external display device.

According to another embodiment, the instructions, when executed by the processor, may cause the processor to further transmit, via the second communication interface, information about a zoom-in and/or a zoom-out of the full image.

According to another embodiment, the total images may include at least one of a computer-generated image or a picture.

Figure 6:
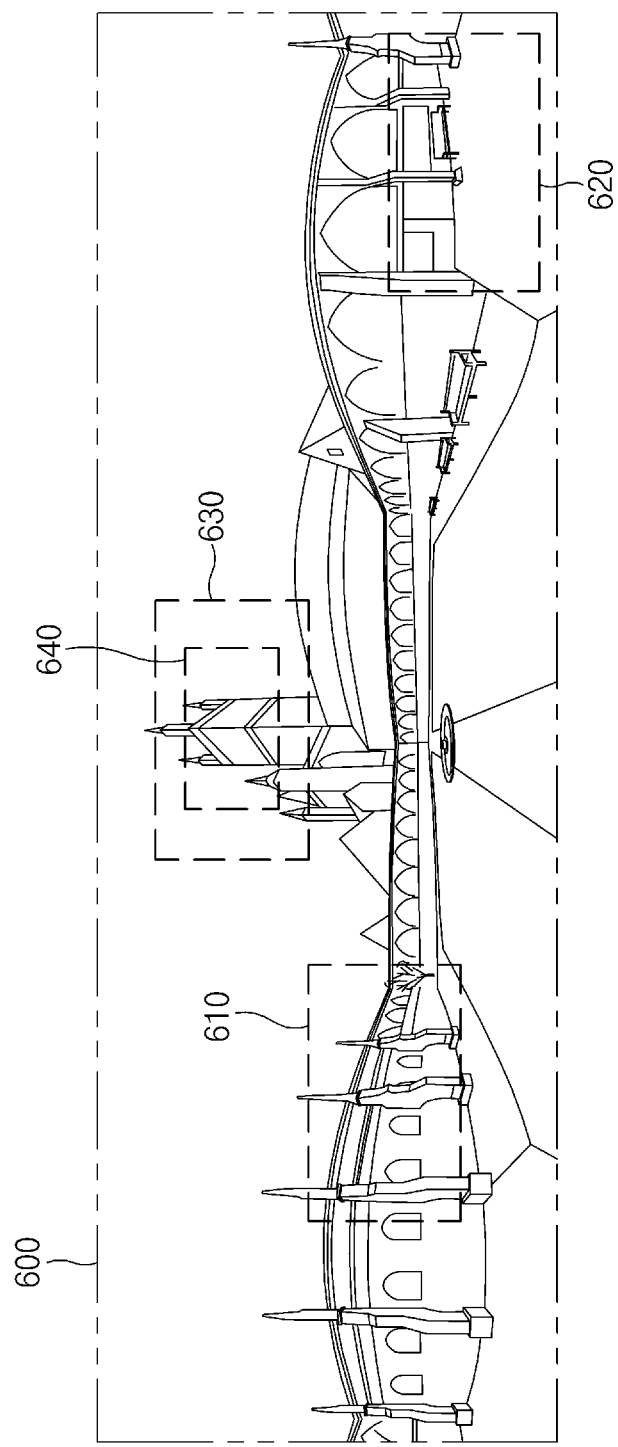
FIG. 6 is a diagram illustrating an example in which a direction an electronic device faces is changed in an omnidirectional image, according to various example embodiments of the present disclosure.

FIG. 6 is a diagram illustrating an example in which a direction an electronic device faces is changed in an omnidirectional image, according to various example embodiments of the present disclosure.

An omnidirectional image 600 illustrated in FIG. 6 may be, for example, a drawing in which an omnidirectional image of a cylindrical form is spread for descriptive convenience. That is, the left side of the omnidirectional image 600 may be continuous with the right side of the omnidirectional image 600.

The electronic device 410 may face a first area 610. The electronic device 410 may face a second area 620 by changing a gaze direction of a user. The electronic device 410 may face a third area 630 by changing the gaze direction of a user. The electronic device 410 may face a fourth area 640 by using a zoom-in.

That is, the electronic device 410 may sequentially display the first area 610, the second area 620, the third area 630, and the fourth area 640 in a screen of the electronic device 410.

Figure 7:
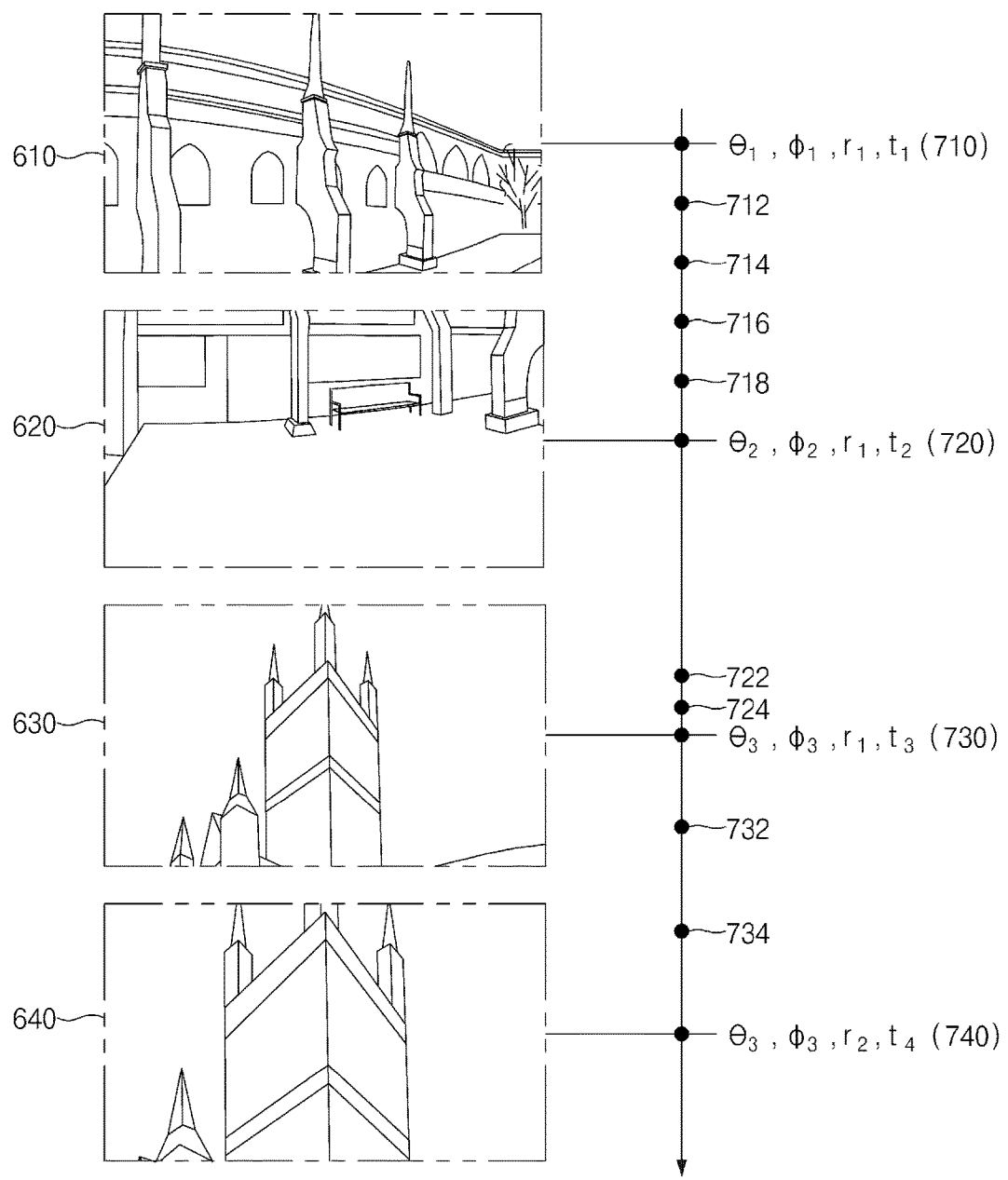
FIG. 7 is a diagram illustrating example information included in first to fourth areas of FIG. 6, according to various example embodiments of the present disclosure.

FIG. 7 is a diagram illustrating example information included in first to fourth areas of FIG. 6, according to various example embodiments of the present disclosure.

Each of first to fourth areas 610 to 640 may indicate a frame displayed in the screen of the electronic device 410.

Referring to FIG. 7, the first area 610 may include a first time t1 as time information. The second area 620 may include a second time t2 as time information. The third area 630 may include a third time t3 as time information. The fourth area 640 may include a fourth time t4 as time information.

In addition, the first area 610 may include θ1, φ1, and r1 values as directional information of the electronic device 410. The θ1, φ1, and r1 values may be values of a spherical coordinate system that centers the electronic device 410. Furthermore, a reference for θ and φ values may be a polar direction. The directional information included in the second area 620 may be θ2, φ2, and r1. In this case, the same 'r' value may mean that expanding information is not changed. The directional information included in the third area 630 may be θ3, φ3, and r1. The directional information included in the fourth area 640 may be θ3, φ3, and r2. That is, the fourth area 640 is located in the same direction as the third area 630 from the electronic device 410. However, expanding ratios which are applied to each case are different from each other.

Accordingly, information 710 included in the first area 610 may be θ1, φ1, r1, and t1. Information 720 included in the second area 620 may be θ2, φ2, r1, and t2. Information 730 included in the third area 630 may be θ3, φ3, r1, and t3. Information 740 included in the fourth area 640 may be θ3, φ3, r2, and t4.

Moreover, although not illustrated in FIG. 6, many areas may be included between the first area 610 and the second area 620, between the second area 620 and the third area 630, and between the third area 630 and the fourth area 640. Besides, directional information and time information may be also included in each of the areas.

Furthermore, the location information of the electronic device 410 may be further included in each of the first to fourth areas 610 to 640. The location information may be a location at which a user watches each of the first to fourth areas 610 to 640. According to various embodiments of the present disclosure, the image 600 illustrated in FIG. 6 may be an image obtained by spreading an omnidirectional image, and the location information may be location information about the center of the omnidirectional image.

Figure 8:
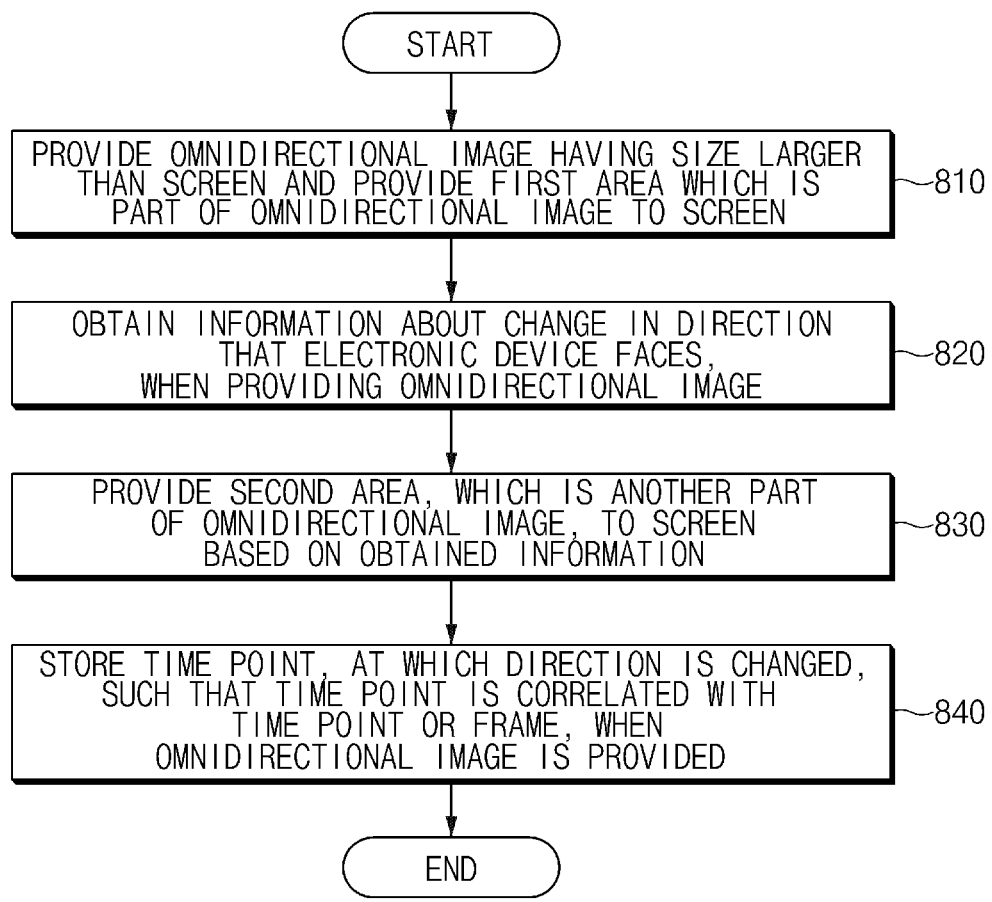
FIG. 8 is a flowchart illustrating an example method for storing information for each frame of an omnidirectional image that an electronic device receives, according to various example embodiments of the present disclosure.

FIG. 8 is a flowchart illustrating an example method for storing information for each frame of an omnidirectional image that an electronic device receives, according to various example embodiments of the present disclosure.

In operation 810, the electronic device 410 may provide an omnidirectional image having a size larger than a screen of the electronic device 410. In this case, a first area which is a part of the omnidirectional image may be provided to the screen of the electronic device 410.

The omnidirectional image may be received from a content server and may be stored in a memory of the electronic device 410.

According to various embodiments of the present disclosure, the electronic device 410 may provide the first area based on the location information and the directional information of the electronic device 410.

According to various embodiments of the present disclosure, after implementing the omnidirectional image, the electronic device 410 may provide the first area based on the location information and the directional information of the electronic device 410. After implementing only the first area being a part of the omnidirectional image, without implementing the full omnidirectional image, the electronic device 410 may provide the first area.

In operation 820, while providing the omnidirectional image (e.g., providing the first area), the electronic device 410 may obtain information about a change in a direction that the electronic device 410 faces. The information about the direction change may be obtained through a gyro sensor or an acceleration sensor included in the electronic device 410.

In operation 830, the electronic device 410 may provide a second area to the screen of the electronic device 410 based on the information obtained in operation 820. The second area may be a part of the omnidirectional image and may be different from the first area.

In operation 840, the electronic device 410 may correlate the time point of the direction change with a time point or a frame, when the omnidirectional image is provided, and may store the correlated time point of the direction change. According to various embodiments, the electronic device 410 may output a user interface associated with storing of a time point of the direction change in a screen such that a user decides to store the time point of the direction change. If an instruction to store is received from the user through the user interface, the electronic device 410 may correlate the time point of the direction change with a time point or a frame at which the omnidirectional image is provided and may store the correlated result. For example, if the second area is provided in 5 seconds after the omnidirectional image is provided, 5 seconds may be stored as time information of the second area. Alternatively, for example, in the case where the frame rate of the omnidirectional image is 60 fps, the electronic device 410 may store the direction change information in the 300-th frame.

Figure 9:
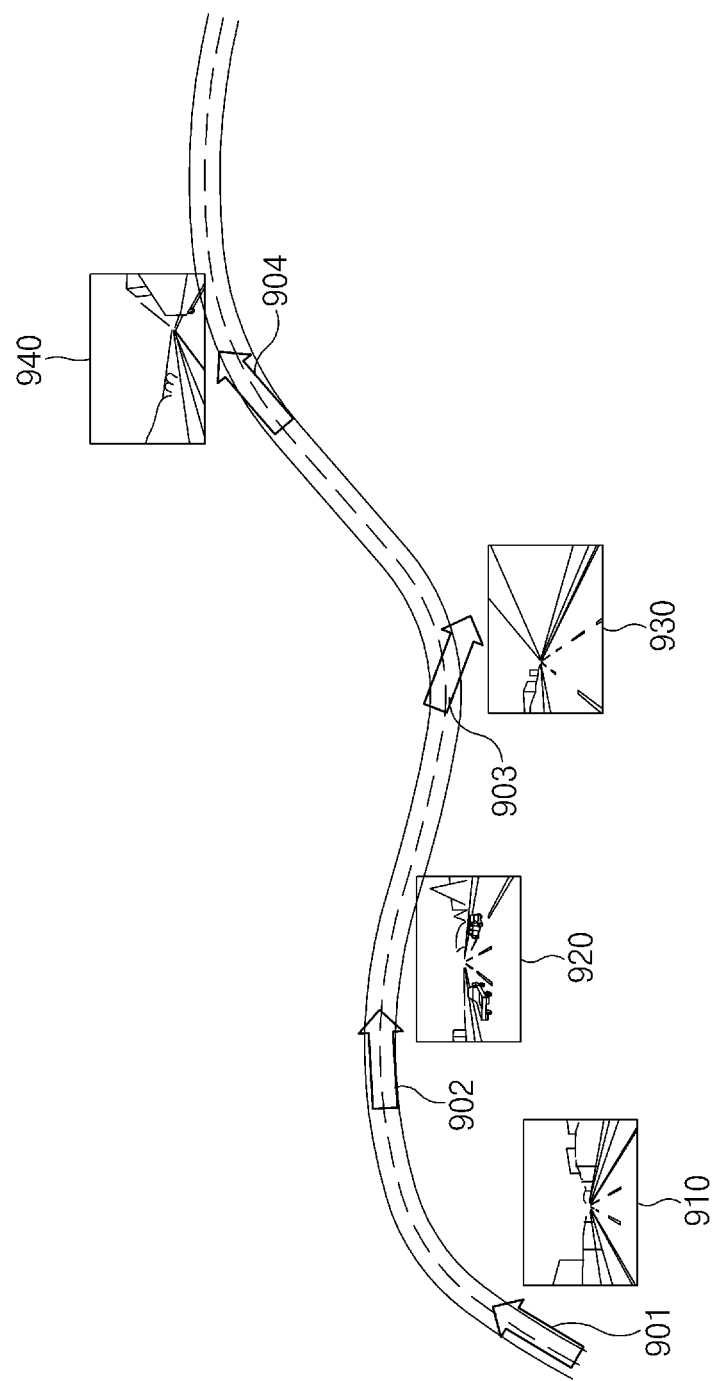
FIG. 9 is a diagram illustrating an example omnidirectional video generated according to a direction of an electronic device when an electronic device is moved, according to various example embodiments of the present disclosure.

FIG. 9 is a diagram illustrating an example of an omnidirectional video generated according to a direction of an electronic device when an electronic device is moved, according to various example embodiments of the present disclosure.

Referring to FIG. 9, a first arrow 901 may indicate a direction that the electronic device 410 faces at a first location of the electronic device 410. A second arrow 902 may indicate a direction that the electronic device 410 faces at a second location of the electronic device 410. A third arrow 903 may indicate a direction that the electronic device 410 faces at a third location of the electronic device 410. A fourth arrow 904 may indicate a direction that the electronic device 410 faces at a fourth location of the electronic device 410.

The first image 910 may be an image corresponding to the first direction 901 that the electronic device 410 faces at the first location. The first image 910 may be a partial image of an omnidirectional image to be provided to the screen of the electronic device 410. The second image 920 may be an image corresponding to the second direction 902 that the electronic device 410 faces at the second location. The third image 930 may be an image corresponding to the third direction 903 that the electronic device 410 faces at the third location. The fourth image 940 may be an image corresponding to the fourth direction 904 that the electronic device 410 faces at the fourth location.

The electronic device 410 may generate an omnidirectional image successively including images (e.g., first to fourth images 910 to 940) corresponding to the direction, which the electronic device 410 faces, along the movement trajectory from the first location to the fourth location. (Refer to FIG. 4C) Location information, directional information, and time information of the electronic device 410 may be included in each frame of the omnidirectional image.

For example, referring to FIG. 9, the first image 910 may include a first time t1 as time information. The second image 920 may include a second time t2 as time information. The third image 930 may include a third time t3 as time information. The fourth image 940 may include a fourth time t4 as time information. According to various embodiments of the present disclosure, the time information may include, for example, a playing starting time and a playing end time of each image.

In addition, the first image 910 may include θ1, φ1, and r1 values as directional information of the electronic device 410. The θ1, φ1, and r1 values may be values of a spherical coordinate system that centers the electronic device 410. Furthermore, a reference for θ and φ values may be the north (a polar direction). The directional information included in the second image 920 may be θ2, φ2, and r1. In this case, the same 'r' value may mean that expanding information is not changed. The directional information included in the third image 930 may be θ3, φ3, and r1. The directional information included in the fourth image 940 may be θ4, φ4, and r1.

According to various embodiments of the present disclosure, the electronic device 410 may set the start of an image, for example, the first image to a reference direction. For example, the electronic device 410 may set the first direction 901 (e.g., θ1, φ1, and r1), which the first image 910 faces, to a default value (θ=90, φ=0, and r=1). Afterwards, the direction of the electronic device 410 may be determined by applying a difference between the direction of the electronic device 410 and the first direction 901 to the default value. For example, the second direction 902 may be calculated by applying a difference between θ1, φ1, and r1 values and θ2, φ2, and r1 values, which is a difference between the second direction 902 and the first direction 901, to the default value (θ=90, φ=0, and r=1).

According to various embodiments of the present disclosure, in the case where there is no directional information, the electronic device 410 may generate directional information by using information obtained through various sensors (e.g., at least one or more sensors included in the sensor circuit 240 of FIG. 2).

Furthermore, the location information of the electronic device 410 may include, for example, GPS information. The GPS information may include longitude, latitude, and altitude information of the electronic device 410.

Below, a table may indicate various pieces of information (e.g., metadata of directional information, location information (or location information in a virtual reality game) of the photographed image, and the like) about the first image 910 and the second image 920 according to various embodiments of the present disclosure. Moreover, the first image 910 may further include information about locations of the first image 910, and the second image 920 may further include information about locations of the second image 920. The information about the locations of the first image 910 and the second image 920 may be information about the location of the object generated by recognizing the object included in the first image 910 and the second image 920 when the omnidirectional image is generated.

|  | Starting time | End time | interval | image size | location information | directional information (θ, φ, r) |
|---|---|---|---|---|---|---|
| The first image (910) | 00;00; 03,300 | 00;00; 08,300 | 5,000 | 800, 600 | 37.576059,126. 977308,100 | 90, 0, 1 |
| The second image (920) | 00;00; 08,300 | 00;00; 12,300 | 4,000 | 800, 600 | 37.576059,126. 977308,100 | 90, 40 ,1 |

The table may be a form that is stored in the memory 415 of the electronic device 410 and/or a content server.

According to various embodiments of the present disclosure, various pieces of information about the first image 910 and the second image 920 may further include focal length information and/or FOV information. In the case where the one of the focal length information and the FOV information is obtained, the other may be obtained by being calculated from the obtained one. In addition, the focal length information and/or the FOV information may be obtained by using information of a camera device that generates the omnidirectional image.

Figure 10:
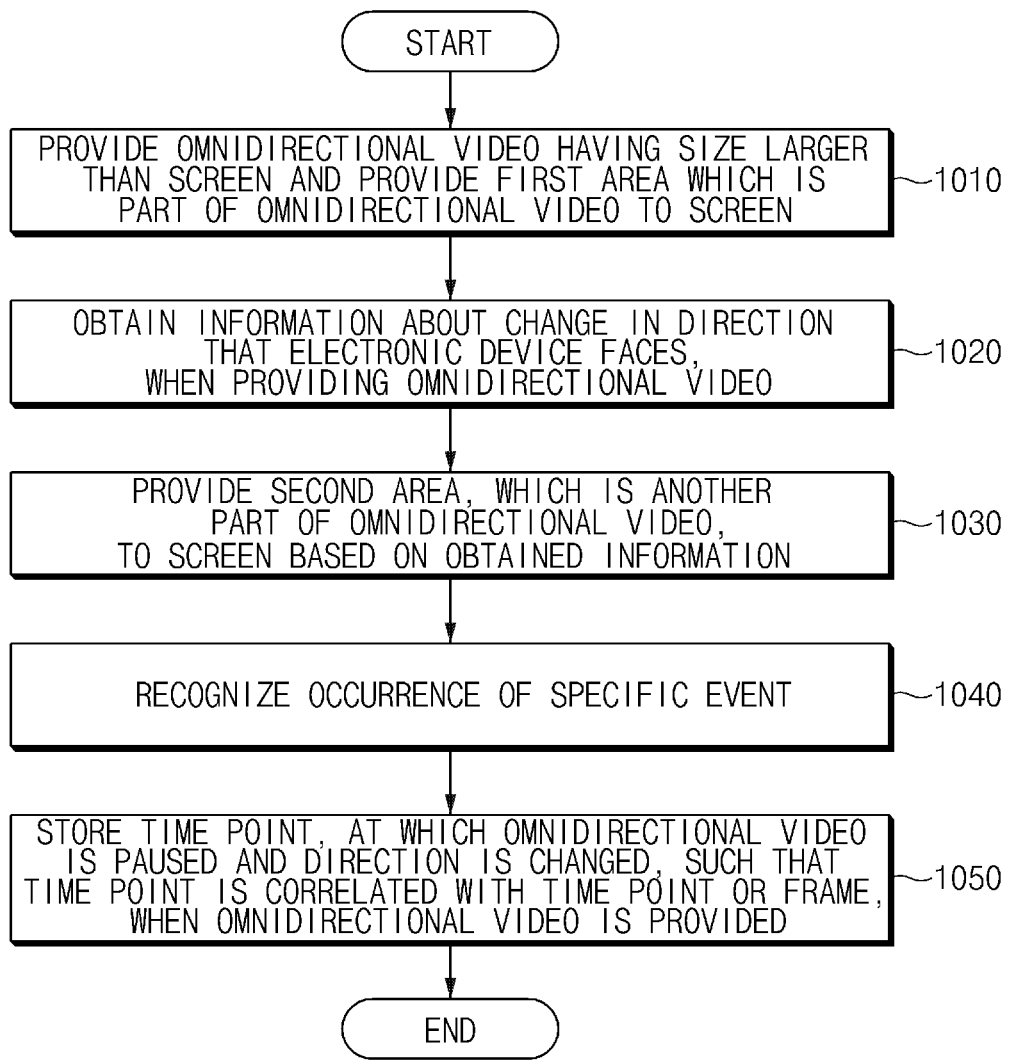
FIG. 10 is a flowchart illustrating an example method for storing information for each frame of an omnidirectional video that an electronic device receives, according to various example embodiments of the present disclosure.

FIG. 10 is a flowchart illustrating an example method for storing information for each frame of an omnidirectional video that an electronic device receives, according to various example embodiments of the present disclosure.

In operation 1010, the electronic device 410 may provide an omnidirectional video having a size larger than a screen of the electronic device 410. In this case, a first area which is a part of the omnidirectional video may be provided to the screen of the electronic device 410.

The omnidirectional video may be received from a content server and may be stored in a memory of the electronic device 410.

According to various embodiments of the present disclosure, the electronic device 410 may provide the first area based on the location information and the directional information of the electronic device 410.

According to various embodiments of the present disclosure, after implementing the omnidirectional image, the electronic device 410 may provide the first area based on the location information and the directional information of the electronic device 410. Alternatively, after implementing only the first area being a part of the omnidirectional image, without implementing the full omnidirectional video, the electronic device 410 may provide the first area.

In operation 1020, while providing the omnidirectional video (e.g., providing the first area), the electronic device 410 may obtain information about a change in a direction that the electronic device 410 faces. The information about the direction change may be obtained through a gyro sensor or an acceleration sensor included in the electronic device 410.

In operation 1030, the electronic device 410 may provide a second area to the screen of the electronic device 410 based on the information obtained in operation 1020. The second area may be a part of the omnidirectional video and may be different from the first area.

In operation 1040, the electronic device 410 may recognize occurrence of a specific event. The specific event may include various types of events that the electronic device 410 is capable of recognizing. For example, in the case where a user input for requesting a pause of an omnidirectional video is received, the electronic device 410 may recognize that the specific event occurs. As another example, the electronic device 410 may recognize that the specific event occurs, for each specific time interval. As another example, in the case where the direction of the electronic device 410 is changed, the electronic device 410 may recognize that the specific event occurs.

In the case where the specific event is recognized, in operation 1050, the electronic device 410 may correlate a time point of the direction change with a time point or a frame, in which the omnidirectional video is provided, and may store the correlated result. According to an embodiment, in the case where a user input for requesting the pause is received, the electronic device 410 may correlate a time point of the pause and a time point of the direction change with a time point or a frame, when the omnidirectional video is provided, and may store the correlated result. For example, if the second area is provided in 5 seconds after the omnidirectional image is provided, 5 seconds may be stored as time information of the second area. In addition, if the omnidirectional image is paused in 8 seconds after the provision of the omnidirectional image, the fact that the second area is paused at 8 seconds may be stored as information. According to an embodiment, the electronic device 410 may correlate a time point of the direction change with a time point or a frame, when the omnidirectional video is provided, for each specific time interval and may store the correlated result. According to an embodiment, in the case where the direction change of the electronic device is recognized, the electronic device 410 may correlate a time point of the direction change with a time point or a frame, when the omnidirectional video is provided, and may store the correlated result.

According to various embodiments, in operation 1050 while playing the omnidirectional video, the electronic device 410 may correlate the time point of the direction change with a time point or a frame, when the omnidirectional video is provided, and may store the correlated result. The electronic device 410 may receive an instruction to store or an instruction to delete from a user at a point in time, when the playing of the omnidirectional video is ended, and may store or delete a record based on an instruction of the user.

Figure 11:
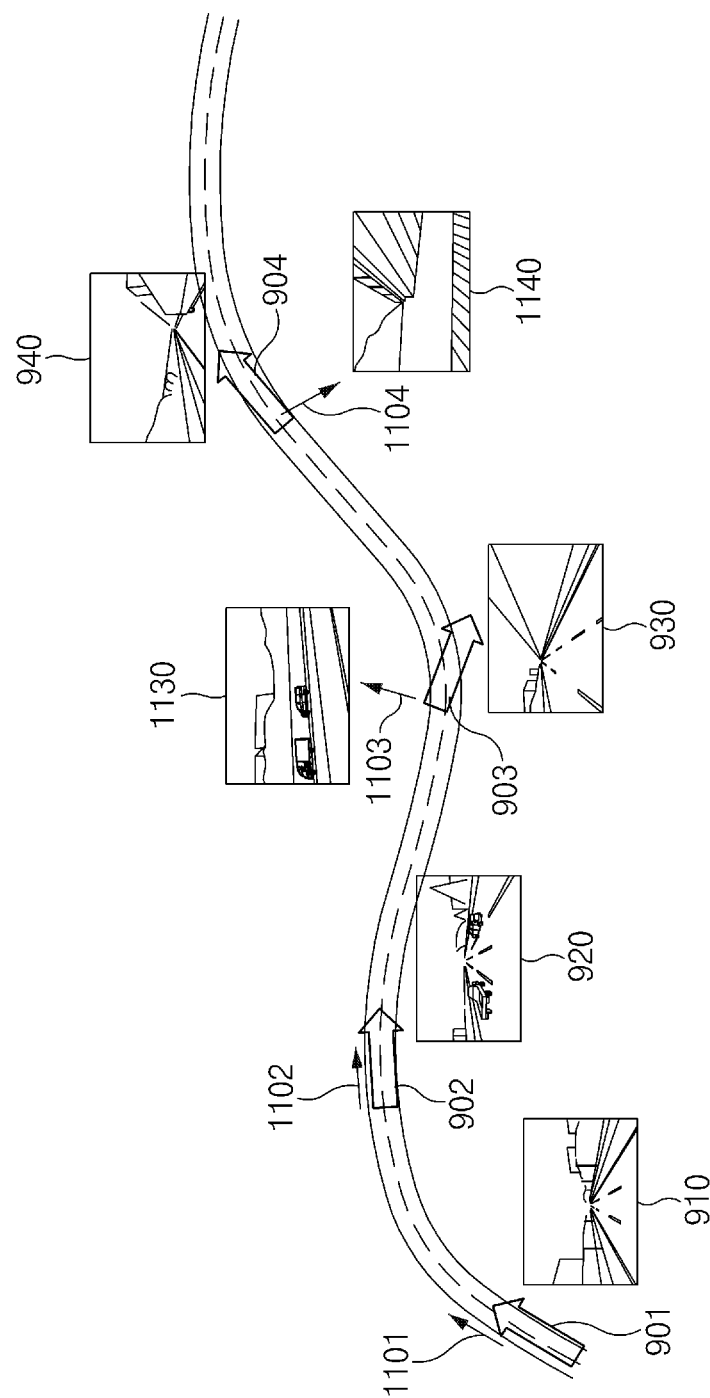
FIG. 11 is a diagram illustrating an example of a change in a direction of an electronic device while an omnidirectional video of FIG. 9 is provided, according to various example embodiments of the present disclosure.

FIG. 11 is a diagram illustrating an example of a change in a direction of an electronic device while an omnidirectional video of FIG. 9 is provided, according to various example embodiments of the present disclosure.

The electronic device 410 may provide the omnidirectional video generated in FIG. 9. The omnidirectional video may be generated by the electronic device 410, and the omnidirectional video generated by another electronic device may be provided.

The omnidirectional video may include the first to fourth images 910 to 940, and the electronic device 410 may provide the omnidirectional video with respect to a reference direction. The reference direction may indicate a direction, in which the electronic device 410 faces the front (12 o'clock direction), and may indicate one direction fixed according to user settings.

The omnidirectional video may be stored while the direction in FIG. 9 is changed from the first direction 901 to the fourth direction 904. However, in the case where the omnidirectional video is provided again, the omnidirectional video may be provided, as it is, with respect to the reference direction. That is, the electronic device 410 does not face the first direction 901 such that the electronic device 410 provides the first image 910. To provide the second image 920, there is no need to change from the first direction 901 to second direction 902 again In this case, while the omnidirectional video is provided, the direction of the electronic device 410 may be changed.

Referring to FIG. 11, the first to fourth directions 901 to 904, the first image 910, and the fourth image 940 may indicate pieces of information at a point in time when the provided omnidirectional video is generated. In addition, fifth to eighth directions 1101 to 1104 may indicate the direction of the electronic device 410 at a point in time when the omnidirectional video is provided.

In FIG. 11, it is illustrated that the fifth to eighth directions 1101 to 1104 move along a road. However, the fifth to eighth directions 1101 to 1104 are illustrated to compare with the first to fourth directions 901 to 904, respectively. Accordingly, the electronic device 410 does not actually move along the road.

The electronic device 410 may maintain the reference direction and may provide the first image 910 and the second image 920. When the third image 930 is provided from the omnidirectional video, the electronic device 410 may change the direction of the electronic device 410 from the reference direction to the seventh direction 1103. In this case, the electronic device 410 may provide a fifth image 1130 to a screen of the electronic device 410. For example, the electronic device 410 may apply a difference between the third direction 903 and the seventh direction 1103 to the omnidirectional image (e.g., the third omnidirectional image 460 of FIG. 4C) of a third location and may provide the fifth image 1130 to the screen of the electronic device 410.

Similarly, the electronic device 410 may change the direction to the eighth direction 1104, at a point in time when the fourth image 940 is provided, and may provide a sixth image 1140.

Figure 12:
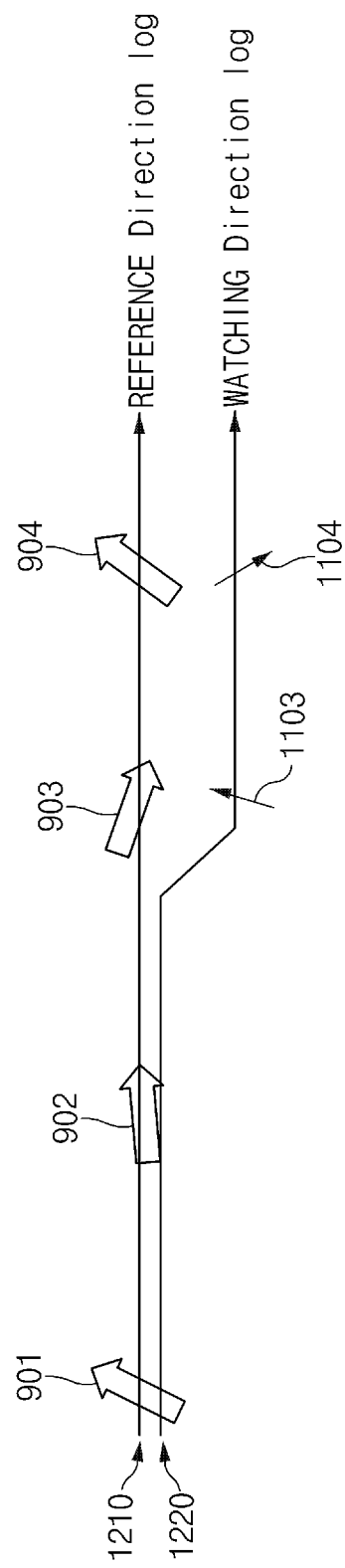
FIG. 12 is a diagram illustrating an example of a change in a direction of an electronic device of FIG. 11 based on a time axis, according to various example embodiments of the present disclosure.

FIG. 12 is a diagram illustrating an example of a change in a direction of an electronic device illustrated in FIG. 11 on a time axis, according to various example embodiments of the present disclosure.

Referring to FIG. 12, a first time axis 1210 may indicate the change in the direction corresponding to an omnidirectional video to be provided to the electronic device 410. A second time axis 1220 may indicate the change in the direction of the electronic device 410 at a point in time when the omnidirectional video is provided.

The electronic device 410 may store the direction of the electronic device 410 at a point in time, when the omnidirectional video is provided, in each provided image (frame). In addition, the electronic device 410 may generate a new omnidirectional video including images that is provided based on the change in the direction of the electronic device 410 from the omnidirectional video.

Figure 13:
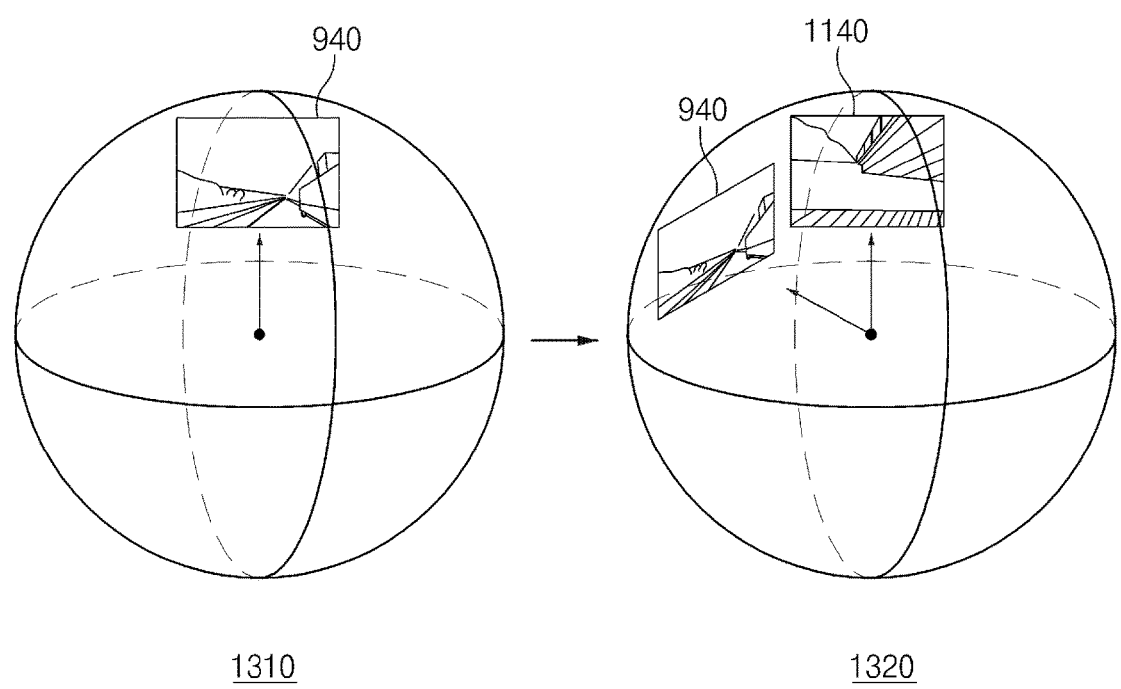
FIG. 13 is a diagram illustrating an example in which another image is provided according to a change in a direction of an electronic device while an omnidirectional video is provided, according to various example embodiments of the present disclosure.

FIG. 13 is a diagram illustrating an example in which another image is provided according to a change in a direction of an electronic device while an omnidirectional video is provided, according to various example embodiments of the present disclosure.

Referring to a view 1310 illustrated on the left of FIG. 13, the electronic device 410 may provide the omnidirectional video with respect to a reference direction. For example, the electronic device 410 may provide the fourth image 940 of FIG. 9 to a screen of the electronic device 410 when the electronic device 410 is in the reference direction.

Referring to a view 1320 illustrated on the right of FIG. 13, the electronic device 410 may change the direction of the electronic device 410 to the right. In this case, the electronic device 410 may provide the sixth image 1140 corresponding to the changed angle.

Spheres of the view 1310 and the view 1320 of FIG. 13 may be rotated by the changed angle, not indicating the same direction as each other.

Figure 14:
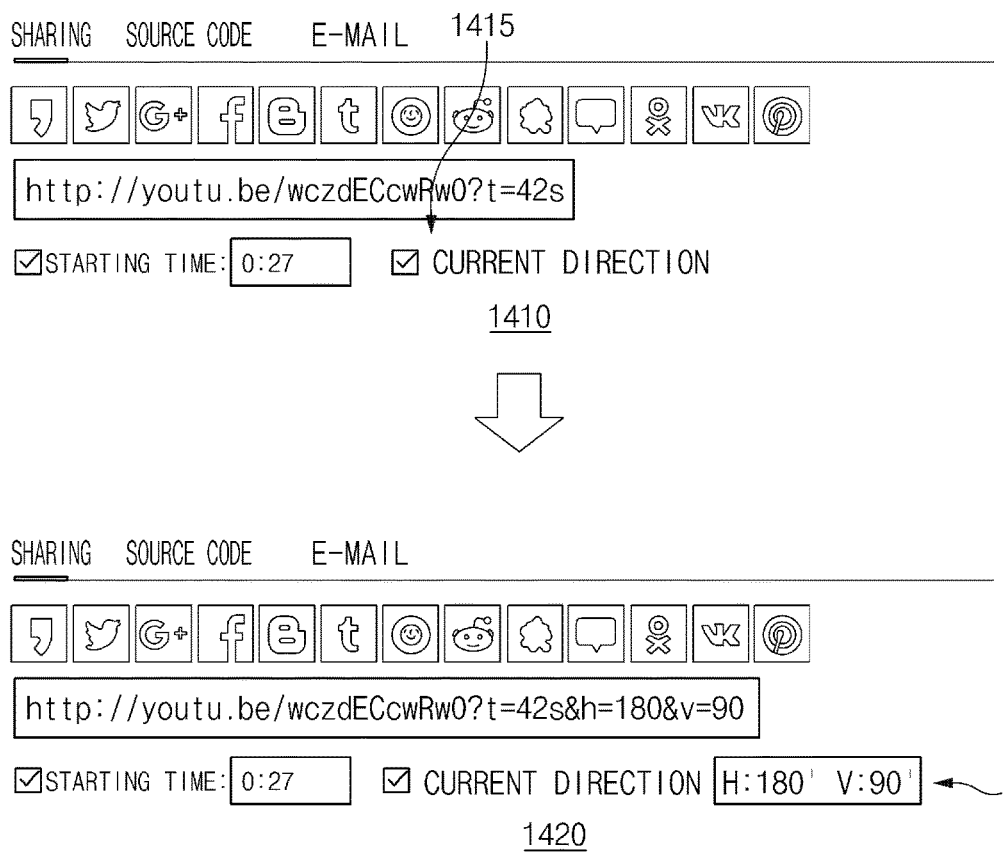
FIG. 14 is a diagram illustrating an example method for sharing an omnidirectional image, according to various example embodiments of the present disclosure.

FIG. 14 is a diagram illustrating an example method for sharing an omnidirectional image, according to various example embodiments of the present disclosure.

Referring to FIG. 14, in operation 1410, a sharing site may receive a user input for selecting a sharing 1415 associated with a current direction of the omnidirectional image in a sharing scheme. The procedure may proceed to operation 1420 based on the user input. In operation 1420, the sharing site may generate a uniform resource locator (URL) corresponding to a current direction 1425 of the omnidirectional image.

Figure 15:
FIG. 15 is a diagram illustrating an example method for sharing an omnidirectional image, according to various example embodiments of the present disclosure.
Figure 15:
Figure 15:

FIG. 15 is a diagram illustrating an example method for sharing an omnidirectional image, according to various example embodiments of the present disclosure.

Referring to FIG. 15, in operation 1510, a sharing site may receive a user input for selecting a sharing 1515 associated with a plurality of sequences included in the omnidirectional image in a sharing scheme. The procedure may proceed to operation 1520 based on the user input. According to various embodiments of the present disclosure, a sequence of director's cut may be selected in the sharing site. In operation 1520, the sharing site may generate a URL corresponding to director's cut 1525 of the omnidirectional image.

Figure 16:
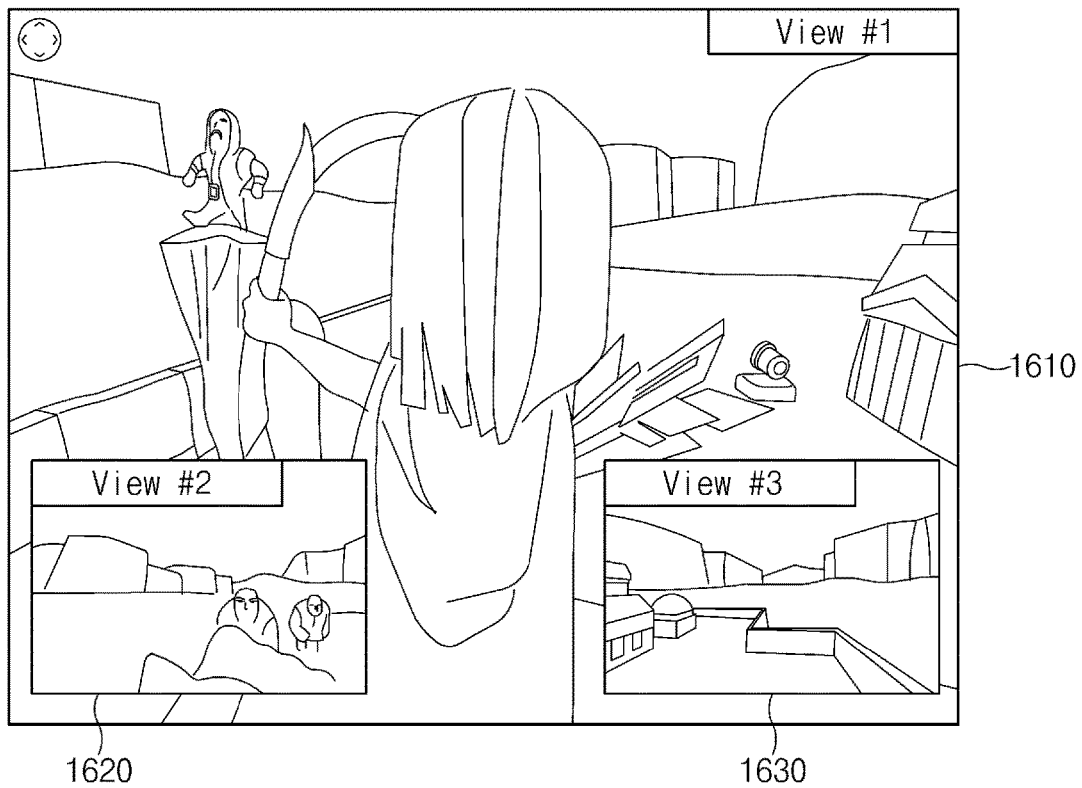
FIG. 16 is a diagram illustrating an example operation in which a plurality of sequences are displayed, according to various example embodiments of the present disclosure.

FIG. 16 is a diagram illustrating an example operation in which a plurality of sequences is displayed, according to various example embodiments of the present disclosure.

Referring to FIG. 16, a first sequence 1610, a second sequence 1620, and a third sequence 1630 may be displayed together with each other. In this case, the second sequence 1620 and the third sequence 1630 may be displayed in a picture-in-picture (PIP) scheme. The first sequence 1610 may be, for example, a sequence of director's cut. The second sequence 1620 may be the most popular sequence. The third sequence 1630 may be the most shared sequence.

According to various embodiments of the present disclosure, the first sequence 1610, the second sequence 1620, and the third sequence 1630 may be omnidirectional images of different directions at the same location, respectively.

According to various embodiments of the present disclosure, in the case where two or more of the first sequence 1610, the second sequence 1620, and the third sequence 1630 face the same direction, only sequences that faces different directions may be displayed such that the two or more sequences are not overlapped. For example, in the case where the first sequence 1610 and the second sequence 1620 face the same direction, the second sequence 1620 may not be displayed.

Figure 17:
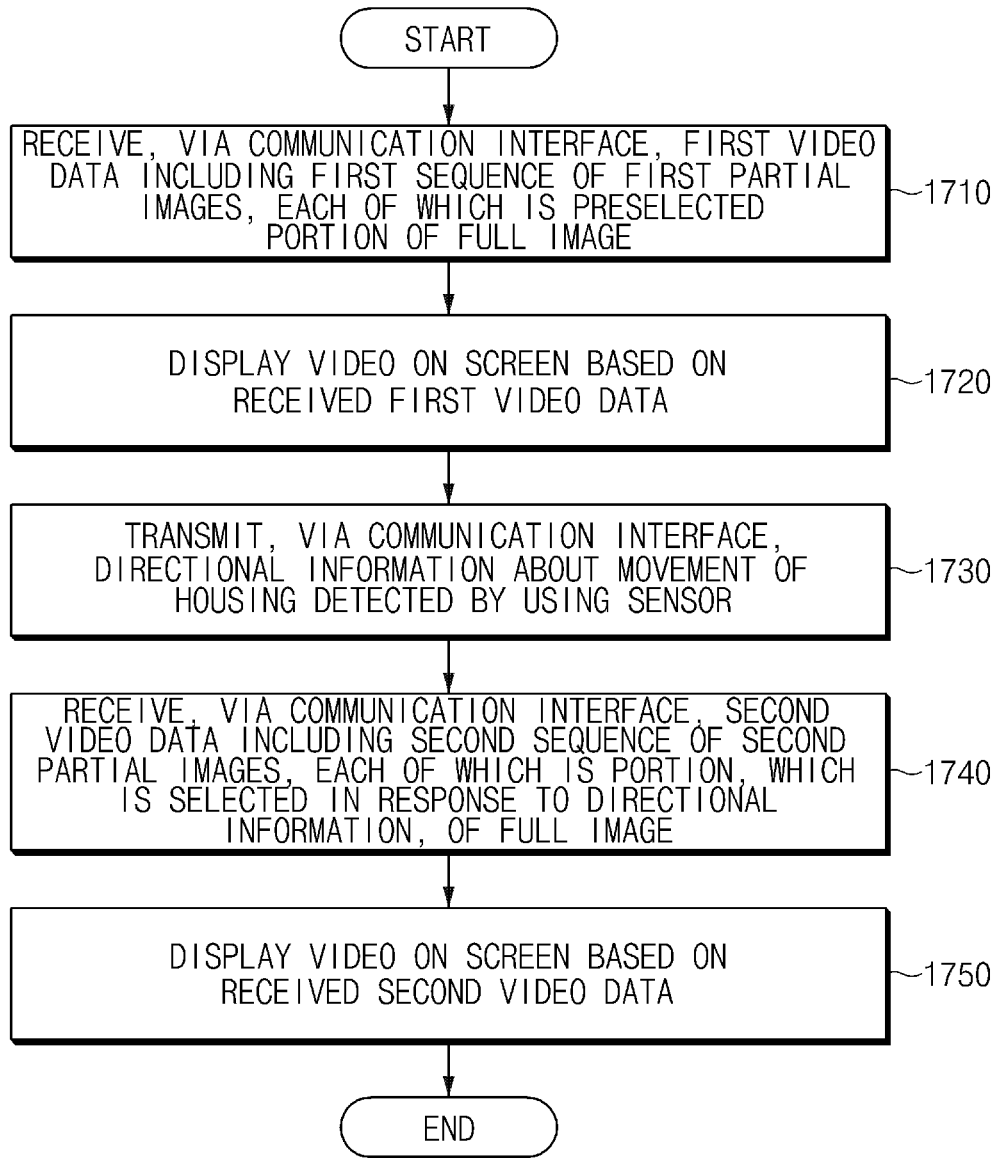
FIG. 17 is a flowchart illustrating an example omnidirectional image providing method of an electronic device, according to various example embodiments of the present disclosure.

FIG. 17 is a flowchart illustrating an example omnidirectional image providing method of an electronic device, according to various example embodiments of the present disclosure. For descriptive convenience, the omnidirectional image providing method will be described with reference to FIG. 11.

The electronic device that executes operation 1710 to operation 1750 may be an electronic device integrated with the electronic device 410 and the external device 500 of FIG. 5A.

In operation 1710, the electronic device may receive, via a communication interface, first video data including a first sequence of first partial images, each of which is a preselected portion of a full image. For example, the electronic device may receive video data including a sequence, in which the first image 910, the second image 920, the third image 930, and the fourth image 940 of an omnidirectional video are included, from an external device (e.g., an external media source providing the omnidirectional image).

In operation 1720, the electronic device may display a video on a screen based on the received first video data. For example, the electronic device may display the sequence, in which the first image 910, the second image 920, the third image 930, and the fourth image 940 are included, on the screen.

In operation 1730, the electronic device may transmit, via a communication interface, directional information about a movement of a housing detected by using a sensor. For example, the electronic device may transmit, via a communication interface, directional information about at least a part of the fifth direction 1101, the sixth direction 1102, the seventh direction 1103, and the eighth direction 1104, which are detected while the first video data is displayed, to an external device.

In operation 1740, the electronic device may receive, via a communication interface, second video data including a second sequence of second partial images, each of which is a portion, which is selected in response to the directional information, of the full image. For example, the electronic device may receive, from the external device, video data including a sequence in which the first image 910, the second image 920, the fifth image 1130 and the sixth image 1140 respectively associated with the fifth direction 1101, the sixth direction 1102, the seventh direction 1103 and the eighth direction 1104 are included.

In operation 1750, the electronic device may display a video on the screen based on the received second video data. For example, the electronic device may display the sequence, in which the first image 910, the second image 920, the fifth image 1130, and the sixth image 1140 are included, on the screen.

Figure 18:
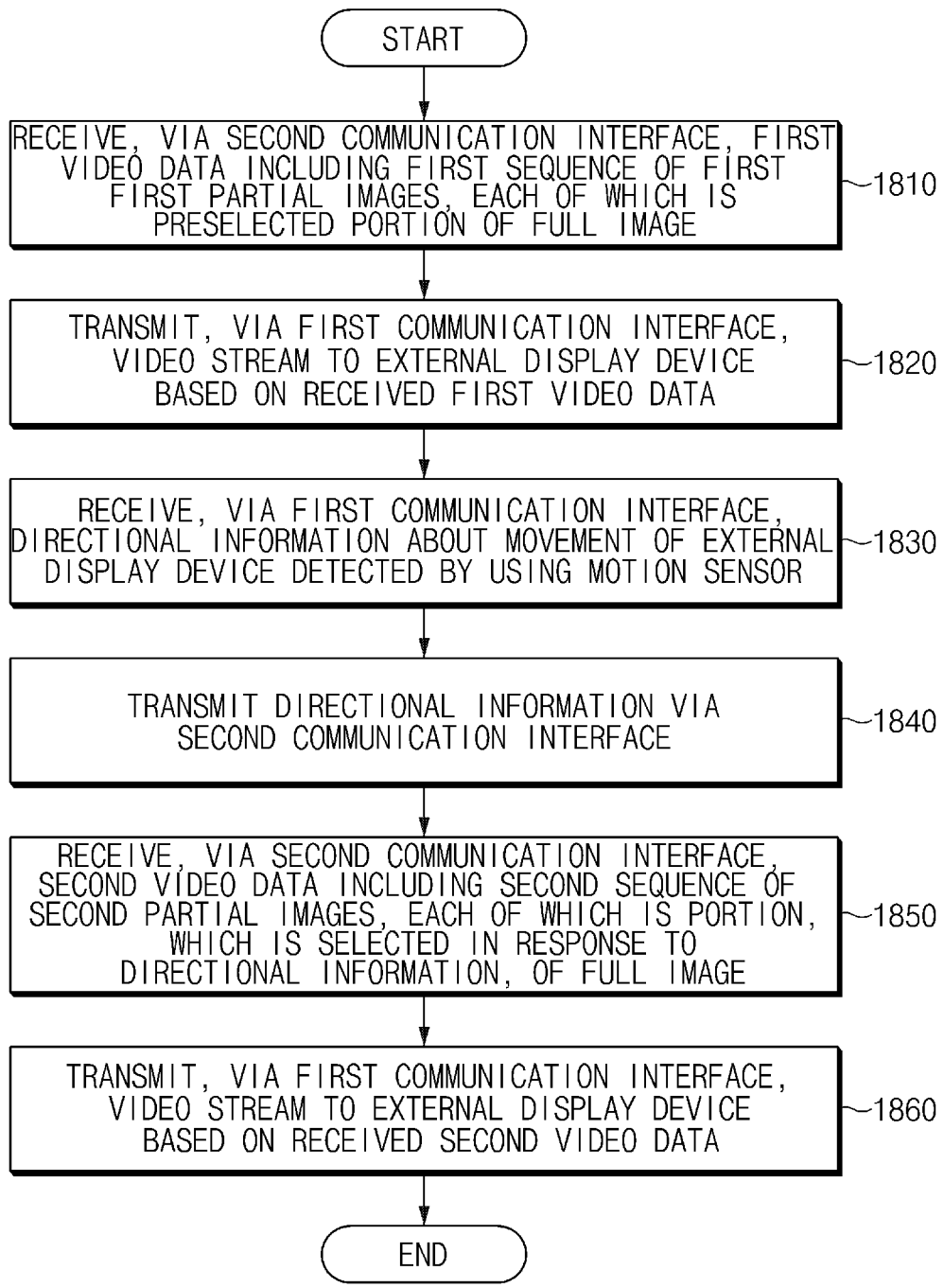
FIG. 18 is a flowchart illustrating an example omnidirectional image providing method of an electronic device, according to various example embodiments of the present disclosure.

FIG. 18 is a flowchart illustrating an example omnidirectional image providing method of an electronic device, according to various embodiments of the present disclosure. For descriptive convenience, the omnidirectional image providing method will be described with reference to FIG. 11.

The electronic device that executes operation 1810 to operation 1860 may be an electronic device, which is connected with an external display device integrated with the electronic device 410 and the external device 500 of FIG. 5A, through a first communication interface in the wired or wireless manner.

In operation 1810, the electronic device may receive, via a second communication interface, first video data including a first sequence of first partial images, each of which is a preselected portion of a full image. For example, the electronic device may receive video data including a sequence, in which the first image 910, the second image 920, the third image 930, and the fourth image 940 of an omnidirectional video are included, from an external media source.

In operation 1820, the electronic device may transmit, via the first communication interface, a video stream to the external display device based on the received first video data. For example, the electronic device may transmit the video stream, in which the first image 910, the second image 920, the third image 930, and the fourth image 940 are included, to the external display device.

In operation 1830, the electronic device may receive, via the first communication interface, directional information about a movement of the external display device detected by using a motion sensor. For example, the external display device may detect, by using the motion sensor included in the external display device, the movement of the external display device in the fifth direction 1101, the sixth direction 1102, the seventh direction 1103, and the eighth direction 1104. The electronic device may receive directional information about at least a portion of the fifth direction 1101, the sixth direction 1102, the seventh direction 1103, and the eighth direction 1104 from the external display device.

In operation 1840, the electronic device may transmit the directional information via the second communication interface. For example, the electronic device may transmit directional information about at least a portion of the fifth direction 1101, the sixth direction 1102, the seventh direction 1103, and the eighth direction 1104 to the external media source.

In operation 1850, the electronic device may receive, via the second communication interface, second video data including a second sequence of second partial images, each of which is a portion, which is selected in response to the directional information, of the full image. For example, the electronic device may receive, from the external media source, video data including a sequence in which the first image 910, the second image 920, the fifth image 1130 and the sixth image 1140 respectively correlated with the fifth direction 1101, the sixth direction 1102, the seventh direction 1103 and the eighth direction 1104 are included.

In operation 1860, the electronic device may transmit, via the first communication interface, a video stream to the external display device based on the received second video data. For example, the electronic device may transmit the video stream, in which the first image 910, the second image 920, the fifth image 1130, and the sixth image 1140 are included, to the external display device.

Figure 19:
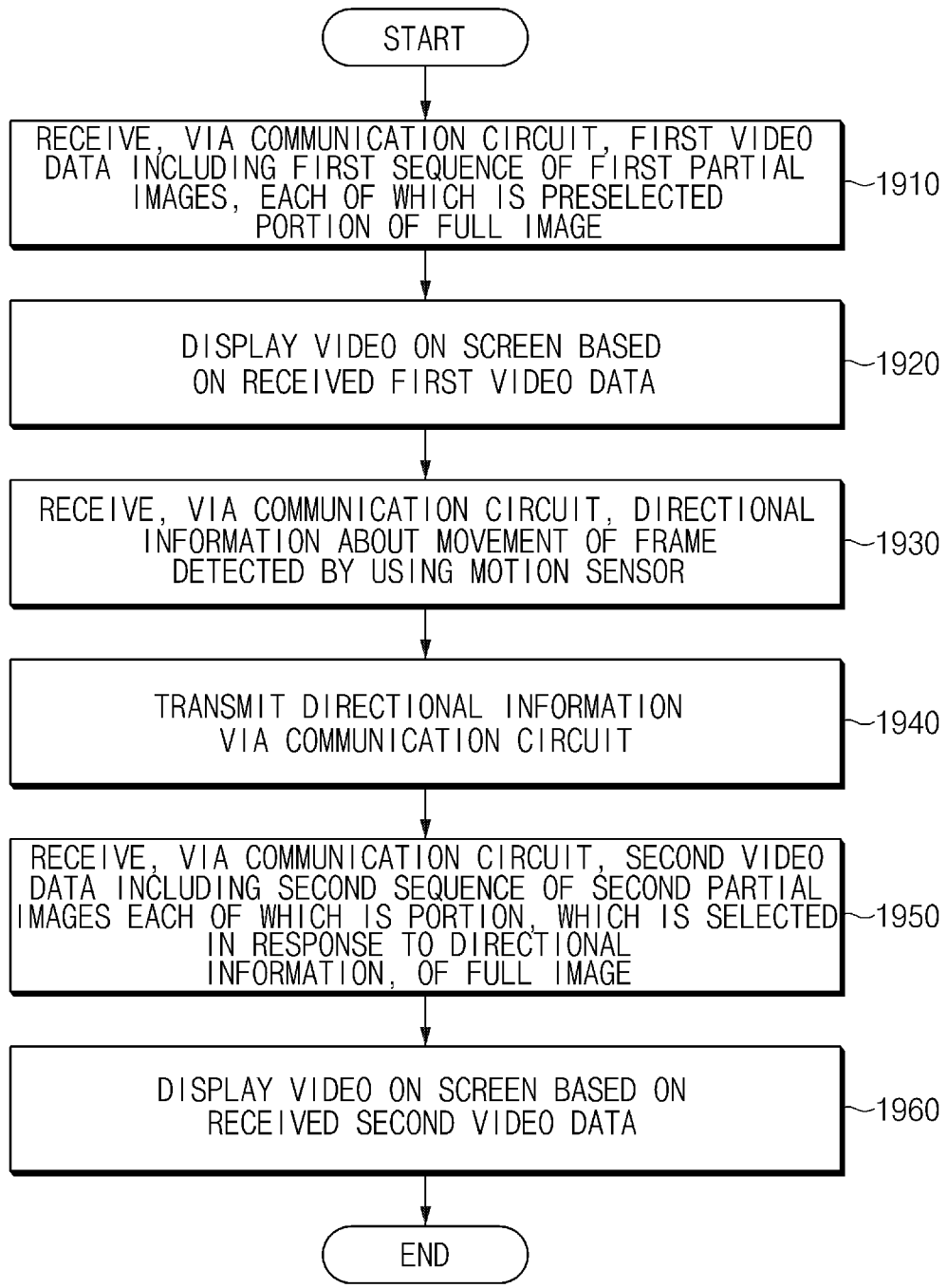
FIG. 19 is a flowchart illustrating an example omnidirectional image providing method of an electronic device, according to various example embodiments of the present disclosure.

FIG. 19 is a flowchart illustrating an example omnidirectional image providing method of an electronic device, according to various example embodiments of the present disclosure. For descriptive convenience, the omnidirectional image providing method will be described with reference to FIG. 11.

The electronic device that executes operation 1910 to operation 1960 may be the electronic device 410 that is electrically connected with the external device 500 of FIG. 5A through an interface.

In operation 1910, the electronic device 410 may receive, via a communication circuit, first video data including a first sequence of first partial images, each of which is a preselected portion of a full image. For example, the electronic device 410 may receive video data including a sequence, in which the first image 910, the second image 920, the third image 930, and the fourth image 940 of an omnidirectional video are included, from an external media source.

In operation 1920, the electronic device 410 may display a video on a screen based on the received first video data. For example, the electronic device 410 may display the video, in which the first image 910, the second image 920, the third image 930, and the fourth image 940 are included, on the screen.

In operation 1930, the electronic device 410 may receive, via the communication circuit, directional information about a movement of a frame that is detected by using a motion sensor. For example, the electronic device 410 may be electrically connected with an external frame, which includes the motion sensor, via the interface. While the video is displayed, the external frame may detect the movement of the external frame. The electronic device 410 may receive directional information about at least a part of the fifth direction 1101, the sixth direction 1102, the seventh direction 1103, and the eighth direction 1104, which are detected while the video is displayed, from the external frame.

In operation 1940, the electronic device 410 may transmit the directional information via the communication circuit. For example, the electronic device 410 may transmit the directional information about at least a portion of the fifth direction 1101, the sixth direction 1102, the seventh direction 1103, and the eighth direction 1104 to the external media source.

In operation 1950, the electronic device 410 may receive, via the communication circuit, second video data including a second sequence of second partial images each of which is a portion, which is selected in response to the directional information, of the full image. For example, the electronic device 410 may receive, from the external device, video data including a sequence in which the first image 910, the second image 920, the fifth image 1130 and the sixth image 1140 respectively associated with the fifth direction 1101, the sixth direction 1102, the seventh direction 1103 and the eighth direction 1104 are included.

In operation 1960, the electronic device 410 may display a video on the screen based on the received second video data. For example, the electronic device 410 may display a sequence, in which the first image 910, the second image 920, the fifth image 1130, and the sixth image 1140 are included, on the screen.

According to an embodiment, an omnidirectional image providing method of an electronic device may include providing an omnidirectional image having a size larger than the screen through a display circuit, providing a first area, which is a part of the omnidirectional image, to the screen, obtaining information about a change in a direction that the electronic device faces, through the sensor circuit when the omnidirectional image is provided, providing the screen with a second area being another partial area of the omnidirectional image through the display circuit based on the obtained information, and to correlate the time point of the direction change with a time point or a frame at which the omnidirectional image is provided and to store the correlated result.

According to an embodiment, the omnidirectional image providing method of the electronic device may include receiving, via a communication interface, first video data including a first sequence of first partial images, each of which is a preselected portion of a respective full image, displaying a video on a screen based on the received first video data, transmitting, via the communication interface, directional information about a movement of a housing that is detected by using a sensor, receiving, via the communication circuit, a second sequence of second partial images, each of which is a part of a respective full image, the part being selected in response to the directional information, and displaying the video on the screen based on the received second video data.

According to an embodiment, the omnidirectional image providing method of the electronic device including a first communication interface and a second communication interface may include receiving, via the second communication interface, first video data including a first sequence of first partial images, each of which is a preselected portion of a respective full image, transmitting, via the first communication interface, a video stream to an external display device based on the received first video data, receiving, via the first communication interface, directional information about a movement of the external display device detected by using a motion sensor included in the external display device, transmitting, via the second communication interface, the directional information, receiving, via the first communication interface, a second sequence of second partial images, each of which is a part of a respective full image, the part being selected in response to the directional information, and transmitting, via the first communication interface, a video stream to a display device.

According to an embodiment, the omnidirectional image providing method of the electronic device may include receiving, via a wireless communication circuit, first video data including a first sequence of first partial images, each of which is a preselected portion of a respective full image, displaying a video on a screen based on the received first video data, receiving, a wireless communication circuit, directional information about a movement of a frame detected by using a motion sensor, transmitting, via the wireless communication circuit, the directional information, receiving, via the wireless communication circuit, a second sequence of second partial images, each of which is a part of a respective full image, the part being selected in response to the directional information, and displaying the video on the screen based on the received second video data.

The term "module" used herein may represent, for example, a unit including one or more combinations of hardware, software and/or firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of a dedicated processor, a CPU, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media in the form of a program module. The instruction, when executed by a processor (e.g., the processor 120), may cause the one or more processors to perform a function corresponding to the instruction. The computer-readable storage media, for example, may be the memory 130.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate as one or more software modules to perform an operation according to various embodiments, and vice versa.

Modules or program modules according to various embodiments may include at least one or more of the above-mentioned elements, some of the above-mentioned elements may be omitted, or other additional elements may be further included therein. Operations executed by modules, program modules, or other elements according to various embodiments may be executed by a successive method, a parallel method, a repeated method, or a heuristic method. In addition, a part of operations may be executed in different sequences or may be omitted. Alternatively, other operations may be added.

According to various embodiments of the present disclosure, an electronic device and a method may obtain various content, which are reconfigured based on movement of the electronic device, from one omnidirectional image by recording movement of the electronic device while an omnidirectional image is outputted. In addition, new content may be generated based on one original omnidirectional image, thereby improving the utilization of the omnidirectional image.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display circuit configured to provide a visual effect through a screen of the electronic device;
a sensor circuit configured to obtain information of a status of the electronic device and/or a status of a periphery of the electronic device;
a processor electrically connected with the display circuit and the sensor circuit; and
a memory electrically connected with the processor,
wherein the memory stores instructions, the instructions, when executed by the processor, cause the electronic device to:
provide an omnidirectional image having a size larger than the screen through the display circuit;
provide the screen with a first area of the omnidirectional image, the first area being a partial area of the omnidirectional image;
obtain information of a change in a direction which the electronic device faces through the sensor circuit when the omnidirectional image is provided;
provide the screen with a second area of the omnidirectional image, the second area being another partial area of the omnidirectional image, through the display circuit based on the obtained information; and
store the information of the change in the direction with a time point of the change in the direction to provide a sequence including the provided first area and the provided second area for replaying the omnidirectional image.

2. The electronic device of claim 1, further comprising:
a communication circuit configured to transmit and/or receive data to and/or from a content server,
wherein the instructions, when executed by the processor, cause the electronic device to:
transmit the obtained information to the content server through the communication circuit.

3. The electronic device of claim 2, wherein the instructions, when executed by the processor, cause the electronic device to:
receive data corresponding to the second area from the content server through the communication circuit.

4. The electronic device of claim 2, wherein the content server is configured to store the transmitted information.

5. The electronic device of claim 1, wherein the omnidirectional image includes at least a part of an omnidirectional still image or an omnidirectional video.

6. The electronic device of claim 5, wherein the instructions, when executed by the processor, cause the electronic device to:
receive an input requesting a pause of the omnidirectional video;
pause the omnidirectional video based on the received input; and
store a pause time stamp together with a time point or a frame at which the omnidirectional video is provided.

7. The electronic device of claim 5, wherein the instructions, when executed by the processor, cause the electronic device to:
provide the screen with the omnidirectional video including one area of the omnidirectional still image.

8. The electronic device of claim 5, wherein the instructions, when executed by the processor, cause the electronic device to:
provide the screen with the omnidirectional video including one area of each of different omnidirectional still images.

9. The electronic device of claim 8, wherein the instructions, when executed by the processor, cause the electronic device to:
provide the screen with the one area of each of the different omnidirectional still images included in the omnidirectional video regardless of the change in the direction of the electronic device, if the omnidirectional image is the omnidirectional video.

* * * * *